United States Patent
Pedigo et al.

(10) Patent No.: US 9,782,938 B2
(45) Date of Patent: Oct. 10, 2017

(54) MANUFACTURING SYSTEM FOR COMPOSITE STRUCTURES

(71) Applicant: The Boeing Company, Chicago, IL (US)

(72) Inventors: Samuel Francis Pedigo, Lake Forest Park, WA (US); Brice Aaron Johnson, Federal Way, WA (US)

(73) Assignee: THE BOEING COMPANY, Chicago, IL (US)

( * ) Notice: Subject to any disclaimer, the term of this patent is extended or adjusted under 35 U.S.C. 154(b) by 654 days.

(21) Appl. No.: 14/221,343

(22) Filed: Mar. 21, 2014

(65) Prior Publication Data

US 2016/0176123 A1 Jun. 23, 2016

(51) Int. Cl.
*B29C 70/38* (2006.01)
*B29C 70/16* (2006.01)
*G05B 19/418* (2006.01)

(52) U.S. Cl.
CPC .......... *B29C 70/382* (2013.01); *B29C 70/16* (2013.01); *B29C 70/384* (2013.01); *B29C 70/386* (2013.01); *B29C 70/388* (2013.01); *G05B 19/41865* (2013.01); *G05B 2219/32332* (2013.01); *Y02P 90/20* (2015.11); *Y10S 901/02* (2013.01)

(58) Field of Classification Search
None
See application file for complete search history.

(56) References Cited

U.S. PATENT DOCUMENTS

| | | | | |
|---|---|---|---|---|
| 5,086,983 A | * | 2/1992 | Darrieux | B65H 81/04 242/434.5 |
| 9,315,007 B2 | * | 4/2016 | Vaniglia | B29C 70/38 |
| 2006/0180264 A1 | * | 8/2006 | Kisch | B29C 70/32 156/173 |
| 2007/0044897 A1 | * | 3/2007 | Hoffmann | B29C 53/8016 156/157 |
| 2009/0095410 A1 | * | 4/2009 | Oldani | B29C 70/382 156/189 |
| 2010/0217437 A1 | * | 8/2010 | Sarh | B64F 5/10 700/248 |
| 2010/0312388 A1 | * | 12/2010 | Jang | G06Q 10/0631 700/248 |
| 2011/0259515 A1 | * | 10/2011 | Rotter | B29C 70/382 156/285 |
| 2011/0272126 A1 | * | 11/2011 | Hamlyn | B29C 70/382 165/177 |
| 2014/0067108 A1 | | 3/2014 | Pedigo et al. | |
| 2016/0082673 A1 | * | 3/2016 | Schibsbye | B29C 70/38 416/230 |

* cited by examiner

*Primary Examiner* — Matthew Daniels
*Assistant Examiner* — Manley Cummins, IV
(74) *Attorney, Agent, or Firm* — Yee & Associates, P.C.

(57) ABSTRACT

A system for manufacturing a composite part. The system comprises fiber placement devices, an overhead track system, and a scheduling controller. The fiber placement devices are configured to operate in a coordinated manner to place fibers at locations on a tool used for manufacturing the composite part. The overhead track system comprises a linear track running co-axial to the tool. The overhead track system is associated with the fiber placement devices and configured to move the fiber placement devices to the locations along a length of the tool. The scheduling controller is configured to coordinate operation of the fiber placement devices such that the fiber placement devices perform tasks simultaneously to place the fibers in a desired configuration on the tool.

19 Claims, 14 Drawing Sheets

MANUFACTURING SYSTEM FOR COMPOSITE STRUCTURES

CROSS-REFERENCE TO RELATED APPLICATION

This application is related to the following U.S. patent application Ser. No. 13/600,686, filed Aug. 31, 2012, and entitled "Systems and Methods for Dynamic Control of Task Assignments in a Fabrication Process," which is incorporated herein by reference in its entirety.

BACKGROUND INFORMATION

1. Field

The present disclosure relates generally to manufacturing and, in particular, to manufacturing composite structures. Still more particularly, the present disclosure relates to a system and method for manufacturing composite structures for aircraft.

2. Background

Aircraft are being designed and manufactured with greater and greater percentages of composite materials. Composite materials may be used in aircraft to decrease the weight of the aircraft. This decreased weight improves performance features such as payload capacities and fuel efficiencies. Further, composite materials provide longer service life for various components in an aircraft.

Composite materials are strong, light-weight materials created by combining two or more functional components. For example, a composite material may include reinforcing fibers bound in a polymer resin matrix. The fibers may be unidirectional or may take the form of a woven cloth or fabric. The fibers and resins are arranged and cured to form a composite material.

In manufacturing composite structures, layers of composite material are typically placed on a tool. The layers of composite material may be comprised of fibers in sheets. These sheets may take the form of fabrics, tape, tows, or other suitable forms. In some cases, resin may be infused or pre-impregnated into the sheets. These sheets are referred to as prepreg.

The different layers of composite material are placed in different configurations and different numbers of layers may be used depending on the thickness of the composite structure being manufactured. These layers of composite material may be laid up by hand or placed on the tool using automated equipment such as a tape laminating machine or a fiber placement device.

In some cases, the size, shape, or both size and shape of the composite structure being manufactured makes placing composite material on the tool more difficult than desired. For instance, in the case of manufacturing structural members for aircraft, the structural members may be longer than the equipment used to place the composite material for the structural member.

As an example, some structural members are over one hundred feet in length. In this case, the structural member may be manufactured in sections and joined together. The process for manufacturing this type of structure may be more complex and time-consuming than desired. The process also may involve rotating the structure such that fiber placement devices have access to the surfaces of the structure. Therefore, it would be desirable to have a method and apparatus that take into account at least some of the issues discussed above, as well as possibly other issues.

SUMMARY

In one illustrative embodiment, a system for manufacturing a composite part comprises fiber placement devices, an overhead track system, and a scheduling controller. The fiber placement devices are configured to operate in a coordinated manner to place fibers at locations on a tool used for manufacturing the composite part. The overhead track system comprises a linear track running co-axial to the tool. The overhead track system is associated with the fiber placement devices and configured to move the fiber placement devices to the locations along a length of the tool. The scheduling controller is configured to coordinate operation of the fiber placement devices such that the fiber placement devices perform tasks simultaneously to place the fibers in a desired configuration on the tool.

In another illustrative embodiment, a method for manufacturing a composite part is provided. Tasks are assigned to fiber placement devices configured to place fibers at locations on a tool used for manufacturing the composite part. Operation of the fiber placement devices is coordinated in a coordinated manner such that the fiber placement devices perform the tasks simultaneously to place the fibers in a desired configuration on the tool. The fiber placement devices are moved to the locations along a length of the tool using an overhead track system comprising a linear track that runs co-axial to the tool. The fibers are placed in the locations on the tool using the fiber placement devices.

In yet another illustrative embodiment, a composite fiber placement system comprises robotic positioning arms, fiber placement devices associated with the robotic positioning arms, and a scheduling controller. The robotic positioning arms are configured to move along a linear track positioned over a tool used for manufacturing a composite part. The fiber placement devices are configured to operate in a coordinated manner to place fibers at locations on the tool. The scheduling controller is configured to identify an order for tasks performed by the fiber placement devices. The scheduling controller is further configured to assign each of the tasks to one of the fiber placement devices based on the order of the tasks. The scheduling controller is still further configured to coordinate operation of the fiber placement devices such that the fiber placement devices perform the tasks simultaneously to place the fibers in a desired configuration on the tool.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
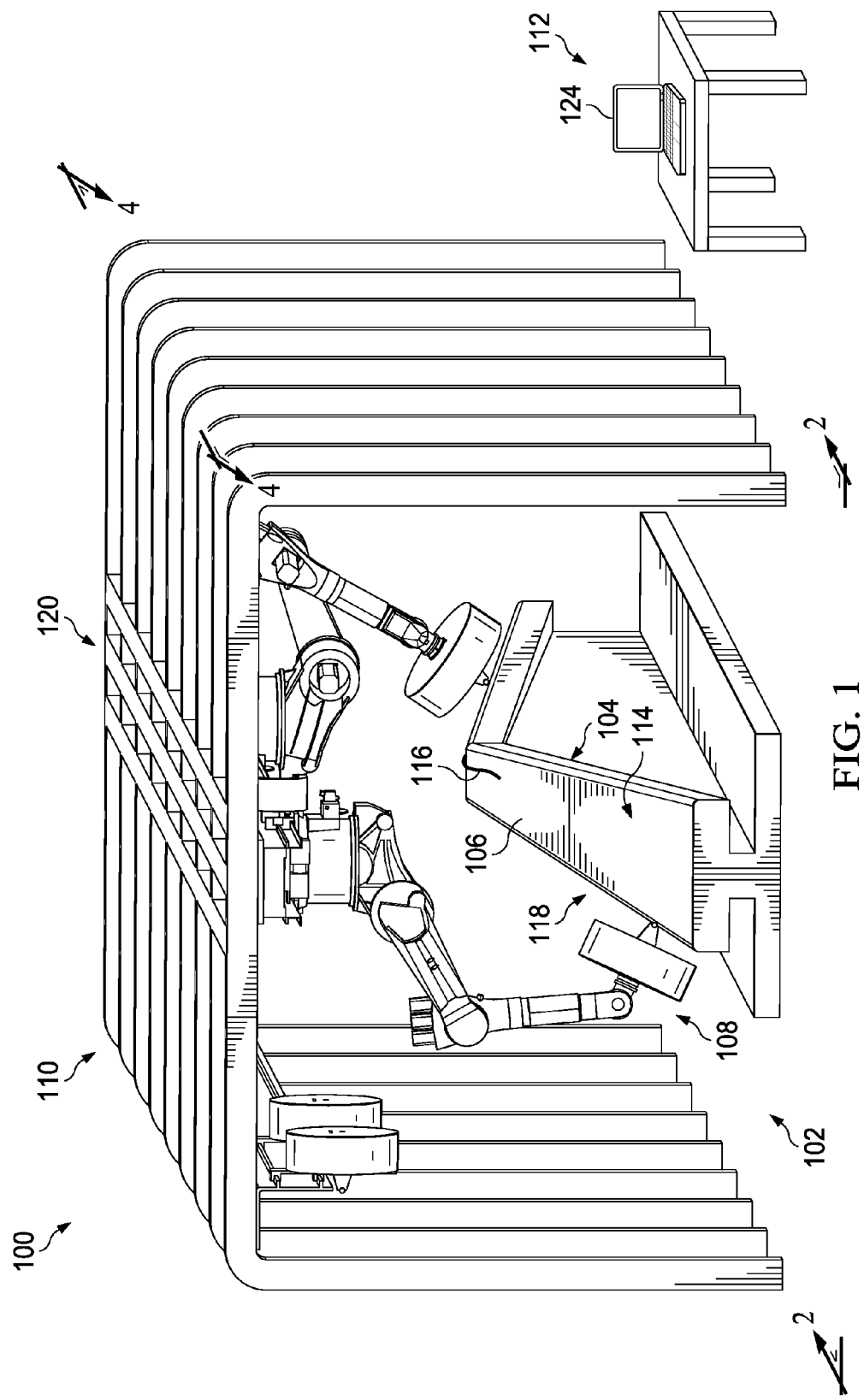
FIG. 1 is an illustration of a manufacturing environment in accordance with an illustrative embodiment.

The illustrative embodiments recognize and take into account one or more different considerations. For example, the illustrative embodiments recognize and take into account that it is desirable to increase the efficiency of an automated system for placing composite material on a tool. For example, the illustrative embodiments recognize and take into account that it is desirable to have an automated system that is capable of placing composite material at various locations along the length of a tool at the same time.

The illustrative embodiments recognize and take into account, however, that some currently used systems which have more than one device used to place composite material on the tool may not have the ability to operate independently of the status of one another while still performing tasks in a coordinated manner when online. For instance, when one device goes offline or is otherwise inoperable, the other devices also shut down until the problem is solved.

The illustrative embodiments further recognize and take into account that it is desirable for each of the devices in the automated system to move along the entire length of the tool to place continuous fibers along the length of the tool when manufacturing some composite structures. These composite structures may take the form of composite parts.

For example, instead of manufacturing the composite part in sections, the illustrative embodiments recognize and take into account that a system with the ability to move along the entire length of the tool, while also having access to all surfaces of the tool, results in the formation of long, complex composite parts more efficiently than before. These parts may include, for example, a spar for an aircraft.

In addition, the illustrative embodiments also recognize and take into account that it is desirable to increase the access of automated fiber placement devices to portions of the tool. For example, the illustrative embodiments recognize and take into account that after placing a first course of composite material on the tool, it may take more time than desired to rotate or otherwise manipulate the tool to access to other portions of the tool.

Thus, the illustrative embodiments provide a method and system for manufacturing a composite part. In an illustrative example, the system comprises fiber placement devices, an overhead track system, and a scheduling controller. The fiber placement devices are configured to operate in a coordinated manner to place fibers at locations on a tool used for manufacturing the composite part. The overhead track system comprises a linear track running co-axial to the tool. The overhead track system is associated with the fiber placement devices and configured to move the fiber placement devices to the locations along a length of the tool. The scheduling controller is configured to coordinate operation of the fiber placement devices such that the fiber placement devices perform tasks simultaneously to place the fibers in a desired configuration on the tool.

Referring now to the figures and, in particular, with reference to FIG. 1, an illustration of a manufacturing environment is depicted in accordance with an illustrative embodiment. In this depicted example, manufacturing environment 100 includes composite fiber placement system 102 and tool 104. Composite fiber placement system 102 moves about tool 104 to form composite part 106. Composite part 106 may be an aircraft part in this illustrative example.

As depicted, composite fiber placement system 102 comprises fiber placement devices 108, overhead track system 110, and scheduling controller 112. In this illustrative example, fiber placement devices 108 hold lengths of composite material 114. These lengths of composite material 114 take the form of fibers 116. Fibers 116 may be selected from one of tows, tape, or other forms of fibers.

In this illustrative example, fiber placement devices 108 are components configured to operate in a coordinated manner to place composite material 114 on tool 104. As used herein, when fiber placement devices 108 operate in a "coordinated manner," fiber placement devices 108 work together to perform tasks in a manner that most efficiently places fibers 116 on tool 104 to form composite part 106. For instance, one of fiber placement devices 108 places a portion of fibers 116 at one of locations 118 while another one of fiber placement devices 108 places a portion of fibers 116 at another one of locations 118.

In this illustrative example, tasks are performed by each of fiber placement devices 108 taking into account the tasks performed by other devices. These tasks are coordinated so that each of fiber placement devices 108 does not interfere with tasks performed by other fiber placement devices 108.

In addition to being coordinated, fiber placement devices 108 perform tasks simultaneously. In other words, fiber placement devices 108 work at the same time to form composite part 106. Although tasks are performed simultaneously, the same tasks may not be performed by each of fiber placement devices 108. Further, the tasks may be performed at the same or a different rate from one another.

As depicted, fiber placement devices 108 are configured to operate in a coordinated manner to place fibers 116 at locations 118 on tool 104 used for manufacturing composite part 106. In this depicted example, fiber placement devices 108 are also configured to work independently of one another. For example, if one of fiber placement devices 108 goes offline, the remaining fiber placement devices 108 continue work and, in some cases, assume the work of the offline device. Tasks may be modified in real time based on the availability or progress of fiber placement devices 108.

As an example, a first fiber placement device in fiber placement devices 108, responsive to a second fiber placement device going offline, is configured to assume tasks assigned to the second fiber placement device such that desired operations continue. In this manner, fiber placement devices 108 operate to minimize production time and improve utilization of fiber placement devices 108 that remain online.

As illustrated, fiber placement devices 108 take various forms. For instance, each one of fiber placement devices 108 may take the form of at least one of a robotic positioning arm, a gantry, or some other suitable type of fiber placement system. Specifically, fiber placement devices 108 may include fiber placement heads, tape laying heads, doubler applicators, or other types of fiber placement devices.

In this depicted example, overhead track system 110 is positioned above tool 104. Overhead track system 110 runs along tool 104. In this illustrative example, overhead track system 110 is physically associated with fiber placement devices 108.

As used herein, a first component, such as overhead track system 110, may be considered to be physically associated with a second component, such as fiber placement devices 108, by being secured to the second component, bonded to the second component, mounted to the second component, welded to the second component, fastened to the second component, connected to the second component in some other suitable manner, or a combination thereof. The first component also may be connected to the second component using a third component. Further, the first component may be considered to be associated with the second component by being formed as part of the second component, as an extension of the second component, or a combination thereof.

In this depicted example, overhead track system 110 comprises linear track 120. Linear track 120 is a structure that provides linear motion, or motion in a straight line, for various devices. In this illustrative example, overhead track system 110 is positioned above tool 104 such that linear track 120 runs co-axial to tool 104. In other words, linear track 120 shares a common axis with tool 104.

Overhead track system 110 with linear track 120 is configured to move fiber placement devices 108 to locations 118 along the length of tool 104. In this illustrative example, each of fiber placement devices 108 is configured to move along linear track 120 over the length of tool 104 to place fibers 116 in the desired configuration. While each of fiber placement devices 108 have the capability to move along the entirety of linear track 120, this movement may be limited by scheduling controller 112.

As illustrated, scheduling controller 112 is a device configured to coordinate operation of fiber placement devices 108. In this illustrative example, scheduling controller 112 is configured to coordinate operation of fiber placement devices 108 such that fiber placement devices 108 perform tasks simultaneously to place fibers 116 in a desired configuration on tool 104.

In this illustrative example, scheduling controller 112 may be implemented in software, hardware, firmware, or a combination thereof. When software is used, the operations performed by scheduling controller 112 are implemented using, for example, without limitation, program code configured to run on a processor unit. When firmware is used, the operations performed by scheduling controller 112 are implemented using, for example, without limitation, program code stored in persistent memory to run on a processor unit.

When hardware is employed, the hardware may include one or more circuits that operate to perform the operations performed by scheduling controller 112. Depending on the implementation, the hardware may take the form of a circuit system, an integrated circuit, an application specific integrated circuit (ASIC), a programmable logic device, or some other suitable type of hardware device configured to perform any number of operations.

A programmable logic device may be configured to perform certain operations. The device may be permanently configured to perform these operations or may be reconfigurable. A programmable logic device may take the form of, for example, without limitation, a programmable logic array, a programmable array logic, a field programmable logic array, a field programmable gate array, or some other type of programmable hardware device.

In some illustrative examples, the operations, processes, or both performed by scheduling controller 112 may be performed using organic components integrated with inorganic components. In some cases, the operations, processes, or both may be performed entirely by organic components, excluding a human being. As one illustrative example, circuits in organic semiconductors may be used to perform these operations, processes, or both.

In an illustrative example, scheduling controller 112 is implemented in computer system 124. Computer system 124 comprises one or more computers. When more than one computer is present in computer system 124, those computers are in communication with each other via a communications medium such as a network.

In this illustrative example, scheduling controller 112 communicates with fiber placement devices 108 using at least one of a wireless communications link, a wired communications link, or in some other suitable manner. In some illustrative examples, scheduling controller 112 is integrated on one or more of fiber placement devices 108.

As used herein, the phrase "at least one of," when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required.

For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

In this illustrative example, fiber placement devices 108 perform tasks at locations 118 to place fibers 116 in a desired configuration at each of locations 118. Fiber placement devices 108 place fibers 116 such that composite part 106 has the shape, contour, structural properties, and surface that is desired. Because fiber placement devices 108 perform tasks to place fibers 116 in a coordinated manner, composite part 106 is formed more efficiently than with some techniques.

Figure 2:
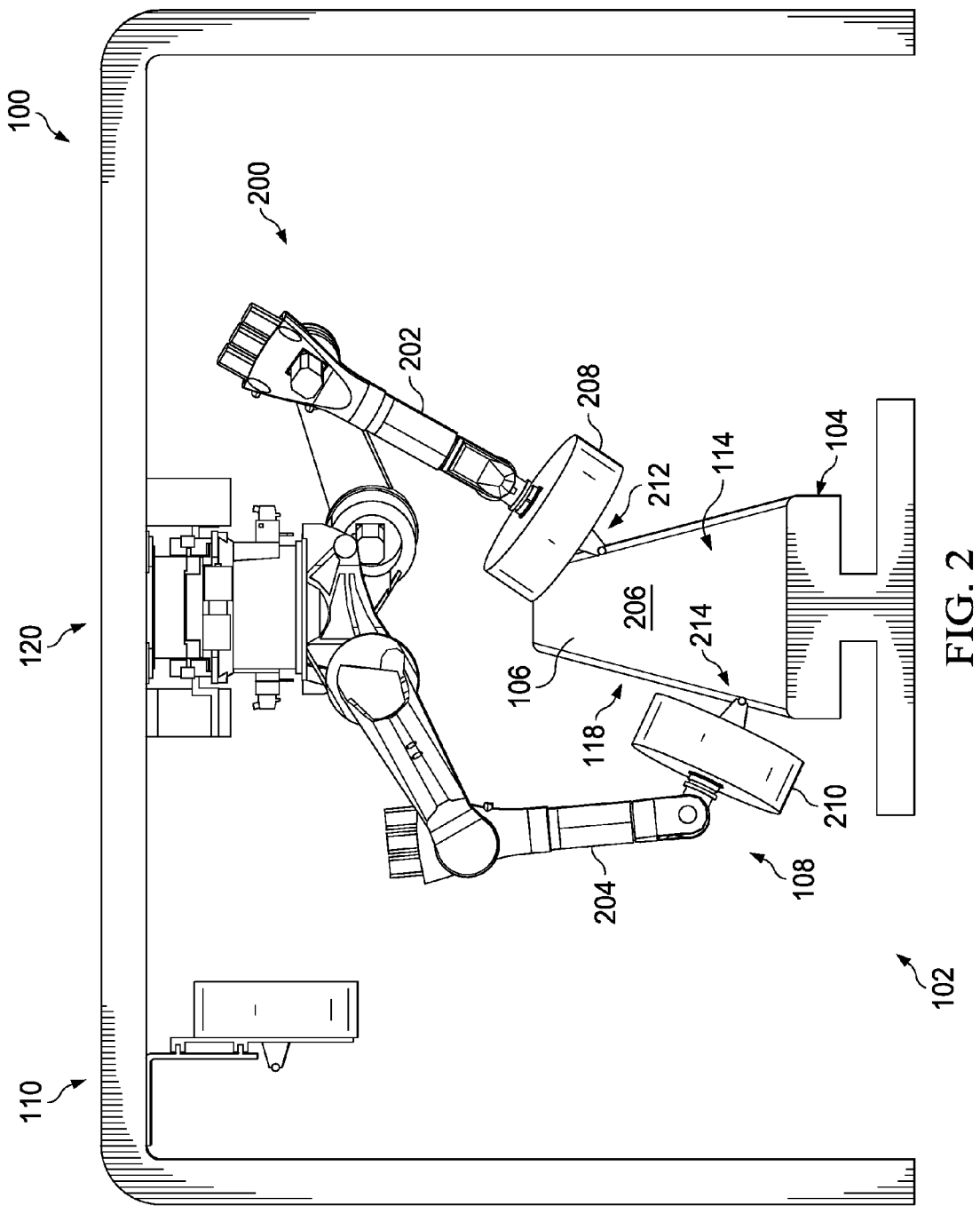
FIG. 2 is an illustration of a composite fiber placement system in accordance with an illustrative embodiment.

With reference next to FIG. 2, an illustration of a composite fiber placement system is depicted in accordance with an illustrative embodiment. In this depicted example, a front view of composite fiber placement system 102 in the direction of lines 2-2 in FIG. 1 is shown.

As depicted, fiber placement devices 108 are mounted on robotic positioning arms 200. In this illustrative example, robotic positioning arms 200 are configured to move using linear track 120. Each of robotic positioning arms 200 is a mechanical arm that is programmable.

Robotic positioning arms 200 include robotic positioning arm 202 and robotic positioning arm 204 in this illustrative example. Robotic positioning arm 202 and robotic positioning arm 204 receive instructions from scheduling controller 112 in FIG. 1.

Robotic positioning arm 202 is configured to move about tool 104 such that robotic positioning arm 202 accesses substantially all of surface 206 of tool 104. In a similar fashion, robotic positioning arm 204 is configured to move about tool 104 such that robotic positioning arm 204 is able to access substantially all of surface 206 of tool 104. In this manner, robotic positioning arm 202, robotic positioning arm 204, or both may place fibers 116 shown in FIG. 1 in various configurations on surface 206 of tool 104.

Robotic positioning arm 202 and robotic positioning arm 204 have 180 degree access to surface 206 of tool 104 in this illustrative example. In other words, robotic positioning arm 202 and robotic positioning arm 204 move corresponding fiber placement devices 108 from one side of tool 104 to the other side of tool 104 to lay a continuous fiber in a desired configuration.

As illustrated, fiber placement devices 108 may place different layers of fibers 116 in different orientations from one another. For example, fiber placement devices 108 may place a layer of fibers 116 in a first orientation and then place another layer of fibers 116 in a second orientation. The movement of robotic positioning arm 202 and robotic positioning arm 204 allow for quick transitions between orientations of fiber placement devices 108 for the different layers of fibers 116.

In this illustrative example, robotic positioning arm 202 has end effector 208. Robotic positioning arm 204 has end effector 210. Fiber placement devices 108 are implemented as end effector 208 and end effector 210 in this illustrative example. Specifically, fiber placement device 212 is end effector 208 of robotic positioning arm 202, while fiber placement device 214 is end effector 210 of robotic positioning arm 204.

Robotic positioning arm 202 and robotic positioning arm 204 work in a coordinated manner to place fibers 116 on tool 104 using fiber placement device 212 and fiber placement device 214, respectively. In this illustrative example, fiber placement device 212 places a portion of fibers 116 in one location. At the same time, fiber placement device 214 places another portion of fibers 116 at a different location along tool 104. Operating in this manner decreases the time needed to form large, complex composite parts such as composite part 106.

Figure 3:
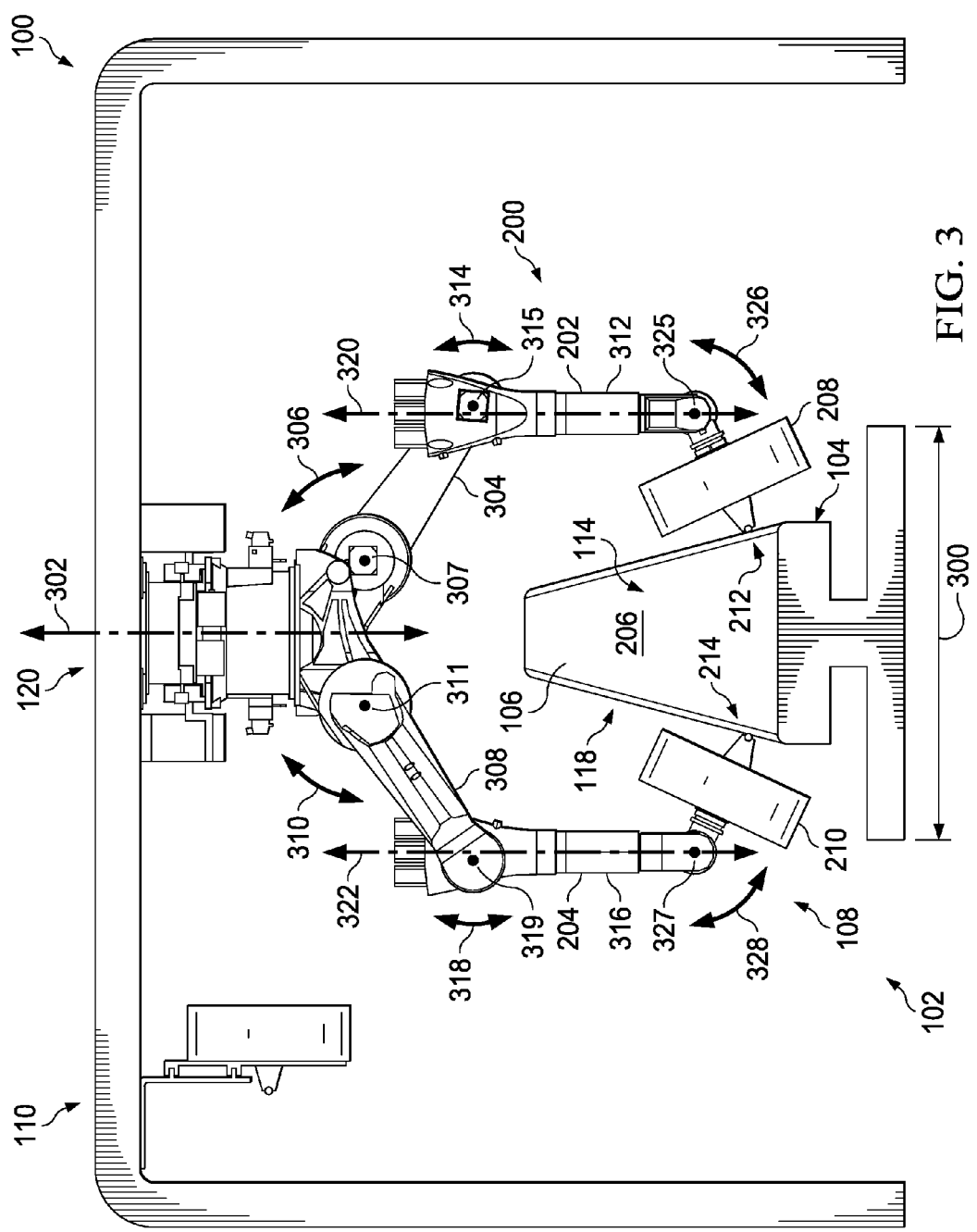
FIG. 3 is an illustration of a composite fiber placement system in accordance with an illustrative embodiment.

Referring now to FIG. 3, an illustration of a composite fiber placement system is depicted in accordance with an illustrative embodiment. In this depicted example, robotic positioning arm 202 with fiber placement device 212 and robotic positioning arm 204 with fiber placement device 214 are shown positioned with respect to the sides of composite part 106.

As depicted, composite part 106 has width 300. Both fiber placement device 212 and fiber placement device 214 are configured to reach substantially all of surface 206 along width 300 of composite part 106 using robotic positioning arm 202 and robotic positioning arm 204, respectively. In this illustrative example, robotic positioning arm 202 and robotic positioning arm 204 are configured to rotate about axis 302.

Section 304 of robotic positioning arm 202 is configured to move in the direction of arrow 306 about point 307. In a similar fashion, section 308 of robotic positioning arm 204 is configured to move in the direction of arrow 310 about point 311. Section 312 of robotic positioning arm 202 is configured to move in the direction of arrow 314 about point 315, while section 316 of robotic positioning arm 204 is configured to move in the direction of arrow 318 about point 319.

In this illustrative example, end effector 208 may rotate about axis 320. End effector 210 may rotate about axis 322.

As illustrated, end effector 208 is also configured to move about point 325 in the direction of arrow 326. End effector 210 is configured to move about point 327 in the direction of 328.

In this manner, fiber placement devices 108 have access to substantially all of surface 206 of tool 104 such that fibers 116 may be placed in various configurations over width 300 of composite part 106. As fibers 116 are placed on tool 104, the orientation of fiber placement devices 108 may be changed to account for varying thicknesses, shapes, and sizes of composite part 106 between locations 118 along the length of composite part 106.

Figure 4:
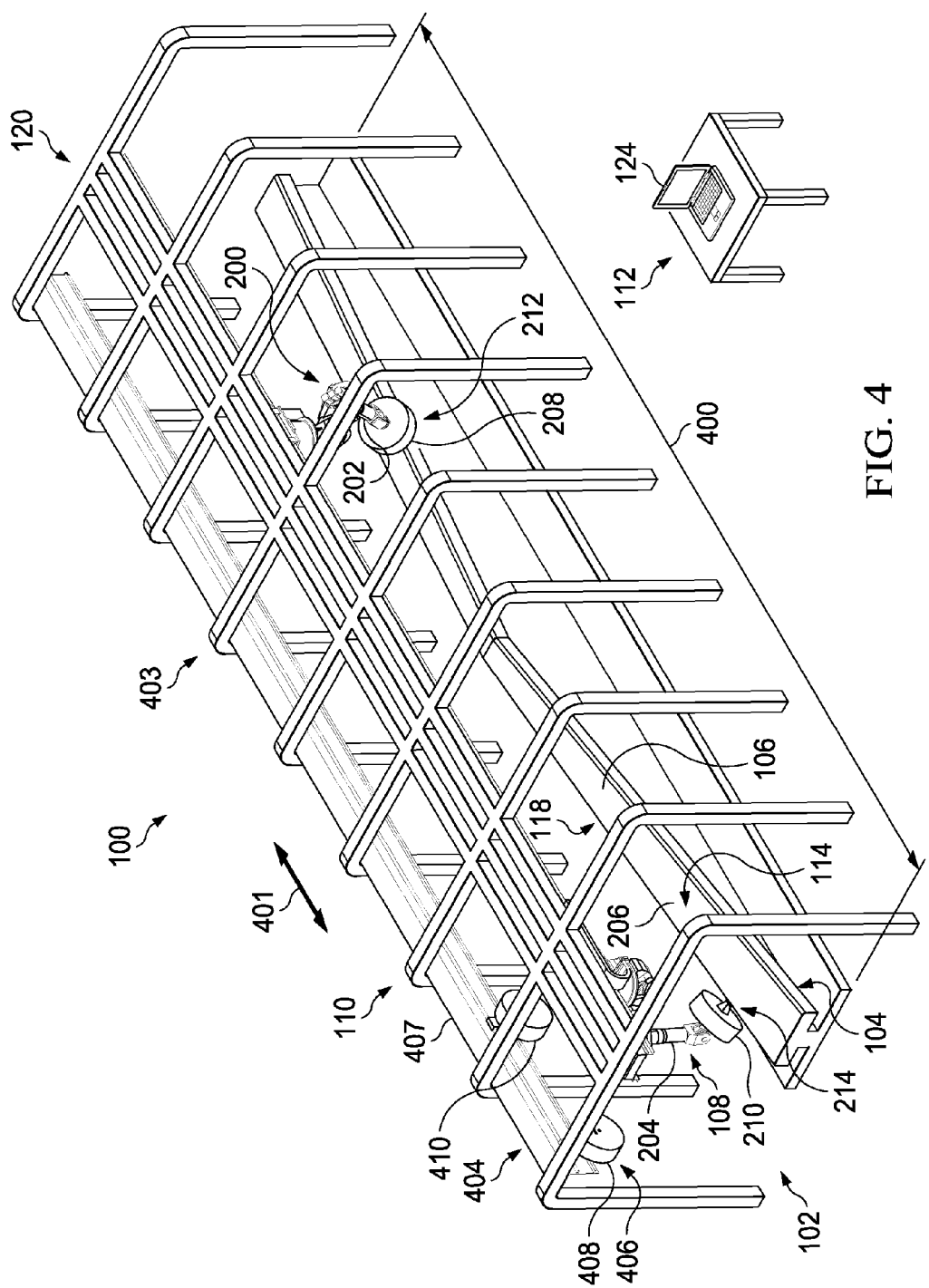
FIG. 4 is an illustration of a perspective view of a manufacturing environment with a composite fiber placement system in accordance with an illustrative embodiment.

Turning now to FIG. 4, an illustration of a perspective view of a manufacturing environment with a composite fiber placement system is depicted in accordance with an illustrative embodiment. In this depicted example, a view of overhead track system 110 seen in the direction of lines 4-4 in FIG. 1 is shown.

As illustrated, overhead track system 110 is positioned above tool 104 over length 400 of tool 104. Length 400 is the entire length of tool 104 in this illustrative example. Length 400 of tool 104 also may represent a length of composite part 106.

As depicted, linear track 120 also runs the entirety of length 400 of tool 104. In this illustrative example, linear track 120 has a length that is greater than or equal to length 400 of tool 104. Robotic positioning arms 200 move co-axially along tool 104 using linear track 120 to form composite part 106. Specifically, robotic positioning arms 200 move back and forth along linear track 120 in the direction of arrow 401.

In this illustrative example, linear track 120 is associated with support structures 403 in overhead track system 110. Support structures 403 reinforce linear track 120 and robotic positioning arms 200 that move along linear track 120. For example, support structures 403 reduce undesired movement of linear track 120, robotic positioning arms 200, or both.

Support structures 403 may take various forms. In this illustrative example, support structures 403 are c-shaped structural members that are spaced apart along the length of tool 104. In other illustrative examples, support structures 403 may be beams, rods, cables, a robotic device, a wall, a ceiling, an overhead platform, and other types of support structures.

Conveyor system 404 is also seen in this view. Conveyor system 404 is associated with support structures 403. Conveyor system 404 is a mechanical device that moves components from one location to another location. Conveyor system 404 is configured to move replacement fiber placement devices 406 in and out of manufacturing environment 100 (not shown).

Conveyor system 404 may take various forms in this illustrative example. For example, without limitation, conveyor system 404 may be selected from one of a gravity roller conveyor system, a belt conveyor system, a pneumatic conveyor system, a chain conveyor system, a track conveyor system, and other suitable types of conveyor systems.

Conveyor system 404 includes conveyor 407 in this illustrative example. Replacement fiber placement devices 406 are positioned with respect to conveyor 407. When one of fiber placement devices 108 does not operate as desired, replacement fiber placement devices 406 are available and may be moved along conveyor 407. A fiber placement device in fiber placement devices 108 may not operate as desired when the fiber placement device is at least one of malfunctioning, depleted of fibers, goes offline, or operates in some other undesired manner.

As an example, when fiber placement device 212 needs to be replaced, robotic positioning arm 202 moves along linear track 120 to drop off fiber placement device 212 on conveyor 407. Robotic positioning arm 202 then picks up fiber placement device 408 or fiber placement device 410 as a replacement and continues work without going offline. In some examples, conveyor 407 transports fiber placement device 212 out of manufacturing environment 100 to be reworked, refilled, discarded, or modified in some other suitable manner.

Figure 5:
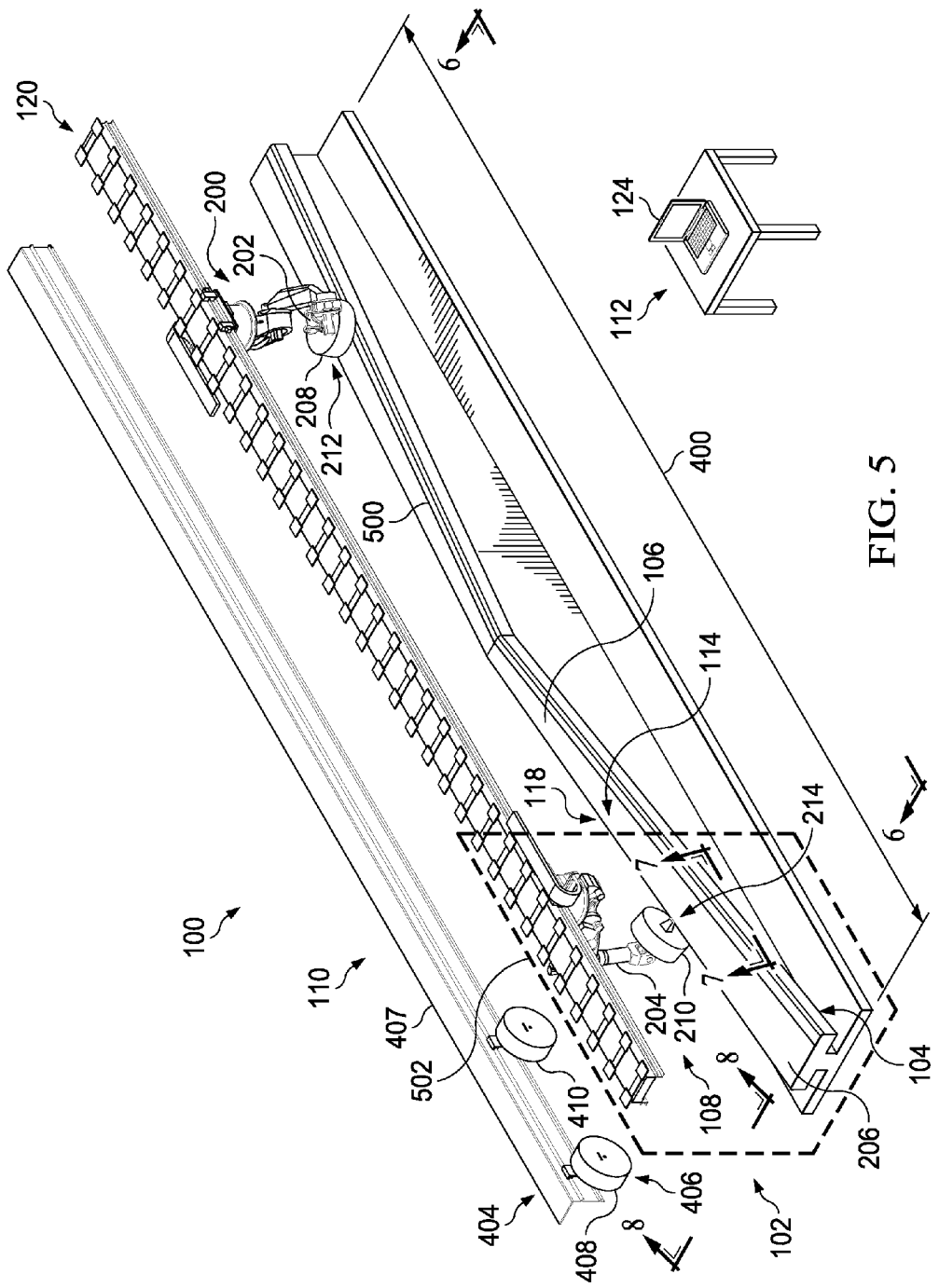
FIG. 5 is an illustration of a perspective view of a manufacturing environment with a composite fiber placement system in accordance with an illustrative embodiment.

Turning next to FIG. 5, an illustration of a perspective view of a manufacturing environment with a composite fiber placement system is depicted in accordance with an illustrative embodiment. Support structures 403 from FIG. 4 are not shown in this view to show composite part 106 and tool 104 in greater detail.

In this illustrative example, fiber placement devices 108 associated with robotic positioning arms 200 are configured to place a continuous fiber along length 400 of composite part 106. For example, fiber placement device 212 on robotic positioning arm 202 places continuous fiber 500 along length 400 of composite part 106.

As depicted, fiber placement device 212 on robotic positioning arm 202 places continuous fiber 500, while fiber placement device 214 on robotic positioning arm 204 performs other tasks to manufacture composite part 106. For instance, robotic positioning arm 204 may move fiber placement device 214 to place a portion of fibers 116 diagonally, across the width of composite part 106, or in some other configuration.

In this illustrative example, robotic positioning arm 204 with fiber placement device 214 is configured to operate within work cell 502. Work cell 502 is a portion of manufacturing environment 100 where robotic positioning arm 204 moves fiber placement device 214 about tool 104 to place fibers 116. In some illustrative examples, additional fiber placement devices perform tasks in other work cells within manufacturing environment 100.

Although work cell 502 is an area defined by scheduling controller 112 in this illustrative example, work cell 502 may be enlarged or restricted, depending on the position of other fiber placement devices 108 in manufacturing environment 100. In other words, the size of work cell 502 can be modified in real time by scheduling controller 112 to place fibers 116 on tool 104 in a desired manner.

In this depicted example, fiber placement device 212 may not have a defined work cell. Instead, fiber placement device 212 moves back and forth along linear track 120 to place continuous fibers along length 400 of tool 104. Fiber placement device 212 and fiber placement device 214 work in a coordinated manner in this illustrative example.

As depicted, fiber placement devices 108 are under the coordinated control of scheduling controller 112. Scheduling controller 112 is configured to identify an order for the tasks performed by fiber placement devices 108 and assign each of the tasks to one of fiber placement devices 108 based on the order of the tasks.

In this illustrative example, the order for the tasks is based on the most efficient manner in which the tasks may be performed. In other words, the order is selected to minimize the production cycle, avoid collisions between fiber placement devices 108, accommodate downtime of one or more of fiber placement devices 108, or some other suitable reason.

These tasks may include one or more operations. A task may include operations such as, for example, without limitation, placing fibers 116 in a desired configuration, forming a desired shape for composite part 106, reworking a portion of composite part 106, moving to one of locations 118, assisting another one of fiber placement devices 108, replacing a fiber placement device, and other suitable types of operations.

For instance, scheduling controller 112 assigns a task to robotic positioning arm 204 with fiber placement device 214 for forming a portion of composite part 106 in work cell 502. Simultaneously, scheduling controller 112 assigns the task of placing continuous fiber 500 along length 400 of tool 104 to robotic positioning arm 202 using fiber placement device 212.

When robotic positioning arm 202 and robotic positioning arm 204 are in the same location, scheduling controller 112 controls operation of the devices such that the devices do not interfere with one another. As tasks are completed, scheduling controller 112 may reprioritize or reassign tasks to various devices.

In this illustrative example, scheduling controller 112 is configured to modify the operation of at least one of fiber placement devices 108 based on an availability of other fiber placement devices 108. Specifically, scheduling controller 112 is configured to reassign the tasks when one of fiber placement devices 108 becomes unavailable.

For example, scheduling controller 112 modifies the operation of fiber placement device 212 based on the availability of fiber placement device 214. As an example, if fiber placement device 214 goes offline, robotic positioning arm 202 with fiber placement device 212 is moved along linear track 120 into work cell 502 to perform tasks originally assigned to fiber placement device 214. When robotic positioning arm 204 with fiber placement device 214 comes back online, robotic positioning arm 202 with fiber placement device 212 may return to its original task, begin a new task, or continue to place fibers 116 in work cell 502.

In other illustrative examples, fiber placement device 212 continues its original task while fiber placement device 214 is unavailable. In this manner, the offline status of fiber placement device 214 does not affect the availability of fiber placement device 214 to perform tasks, unless scheduling controller 112 modifies those tasks. Scheduling controller 112 controls fiber placement devices 108 as needed to promote efficient formation of composite part 106.

With the ability to move robotic positioning arm 202 with fiber placement device 212 along length 400 to place continuous fiber 500, large, complex composite parts may be manufactured efficiently. A large, complex composite part may be a part that includes various features that make manufacturing the part difficult. For instance, an aircraft spar may have bends, flanges, a tapered thickness, and other features that make manufacturing difficult. In some cases, these composite parts may be over one hundred feet in length. The parts may be longer or shorter, depending on the particular implementation. In addition, the composite parts no longer need to be manufactured in sections and joined together through other processes. As a result, manufacturing time and cost may be reduced.

Figure 6:
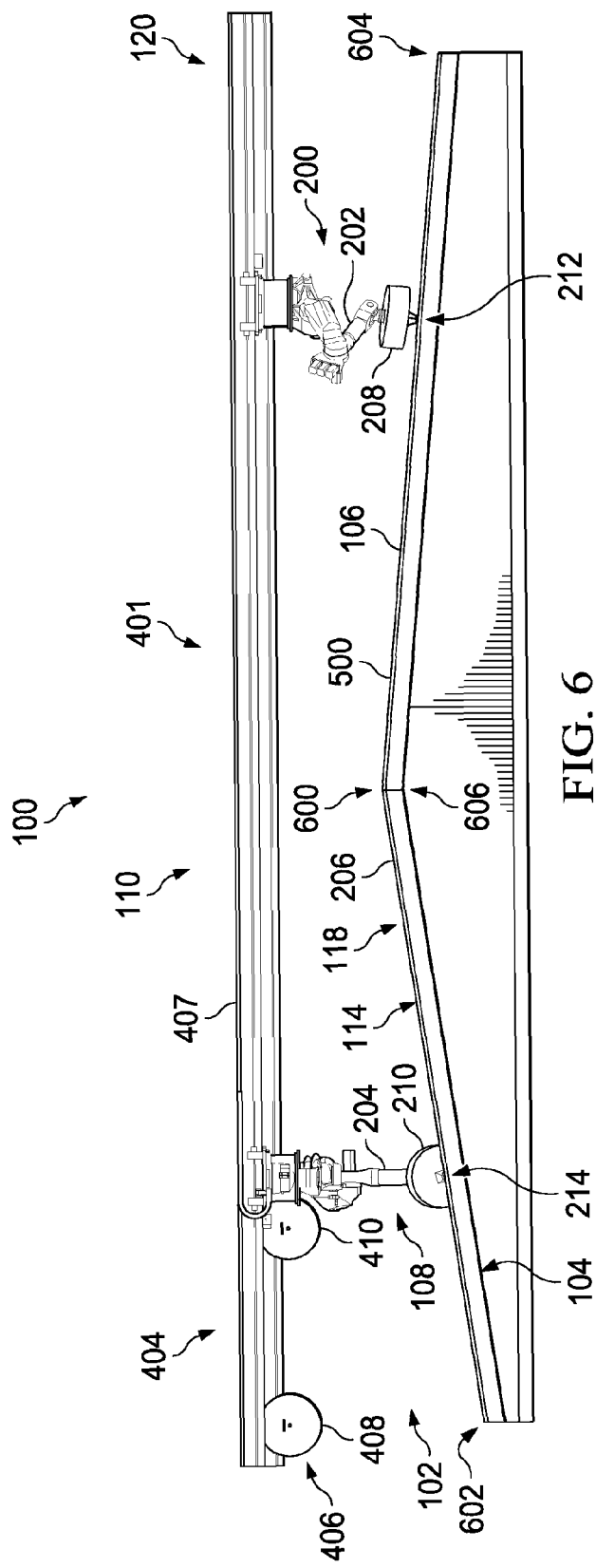
FIG. 6 is an illustration a manufacturing environment with a composite fiber placement system in accordance with an illustrative embodiment.

Referring now to FIG. 6, an illustration a manufacturing environment with a composite fiber placement system is depicted in accordance with an illustrative embodiment. In this depicted example, a side view of composite part 106 being formed on tool 104 shown in the direction of lines 6-6 in FIG. 5 is depicted.

In this illustrative example, composite part 106 has a thickness that changes between locations 118 along length 400 of composite part 106. For example, the thickness of composite part 106 at location 600 is different than the thickness of composite part 106 at location 602 and location 604. The orientation of fiber placement devices 108 needs to be modified to take into account these changes in thickness.

As depicted, composite part 106 is manufactured with bend 606 at location 600. As fiber placement device 212 is moved along length 400 of tool 104 using linear track 120, robotic positioning arm 202 changes the orientation of fiber placement device 212 to place continuous fiber 500 in a desired manner. In other words, robotic positioning arm 202 is controlled to account for varying thicknesses, heights, shapes, configurations, or a combination thereof when placing fibers 116. As a result, fiber placement devices 108 is configured to move about tool 104 such that fibers 116 are placed in the desired configuration with respect to the thickness of composite part 106 desired at locations 118.

In this illustrative example, the ability to place fibers 116 over bend 606 results in decreasing the number of steps performed to manufacture composite part 106. For instance, because fiber placement devices 108 have access to substantially all of surface 206 of tool 104 along length 400 of tool 104, composite part 106 can be formed in one piece, without the need to join sections of composite part 106 together. In other words, composite part 106 is formed without discontinuity.

Figure 7:
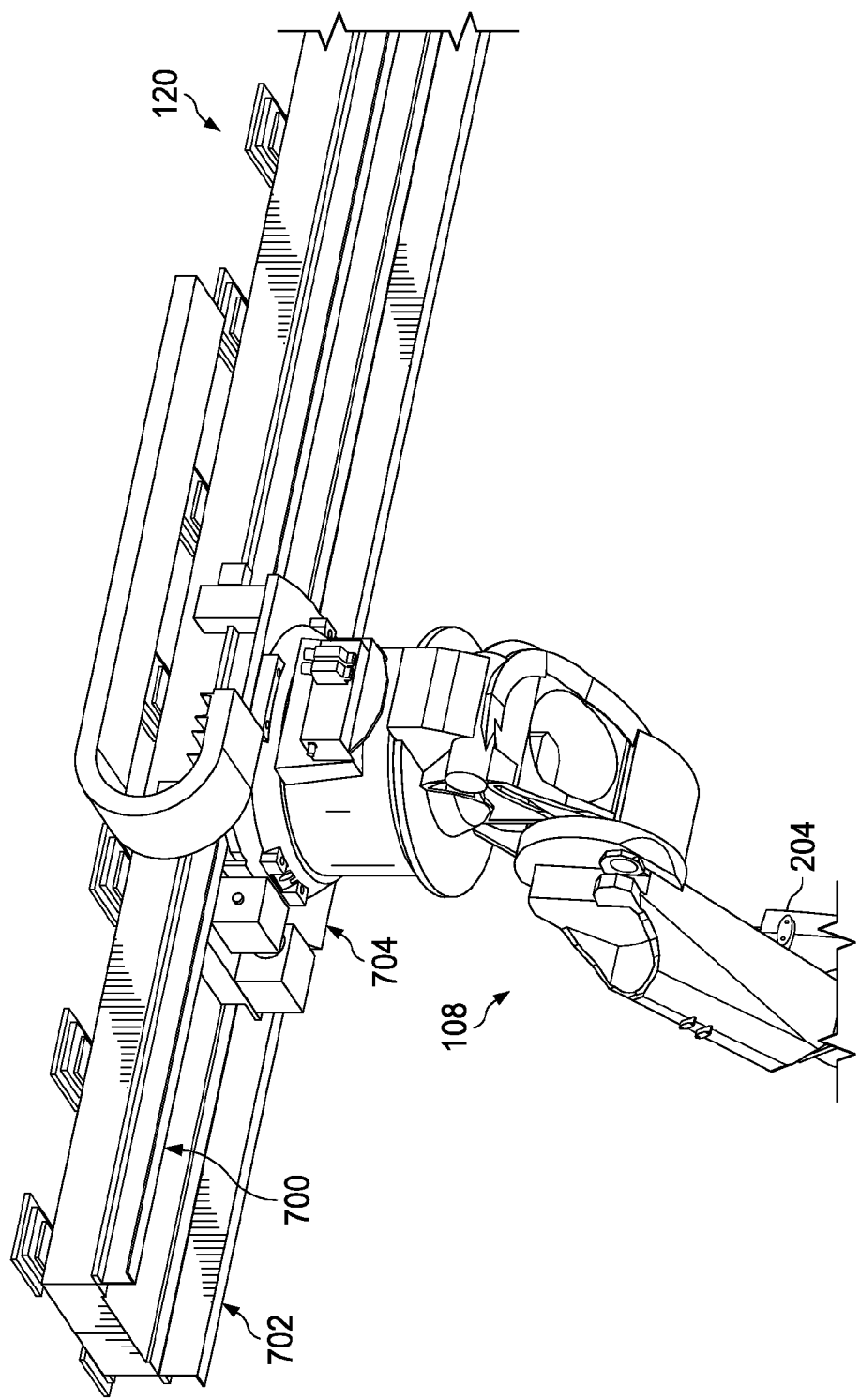
FIG. 7 is an illustration of a linear track in accordance with an illustrative embodiment.

Turning to FIG. 7, an illustration of a linear track is depicted in accordance with an illustrative embodiment. In this depicted example, components within linear track 120 are shown in greater detail.

In this illustrative example, linear track 120 includes rail 700 and rail 702. Robotic positioning arm 204 is mounted to carriage assembly 704 in this depicted example. Carriage assembly 704 is configured to move along linear track 120 using rail 700. For example, carriage assembly 704 may include guide wheels (not shown) that allow robotic positioning arm 204 to move along rail 700. In other illustrative examples, linear track 120 and the components within linear track 120 may be arranged in some other manner, depending on the functionality involved.

Figure 8:
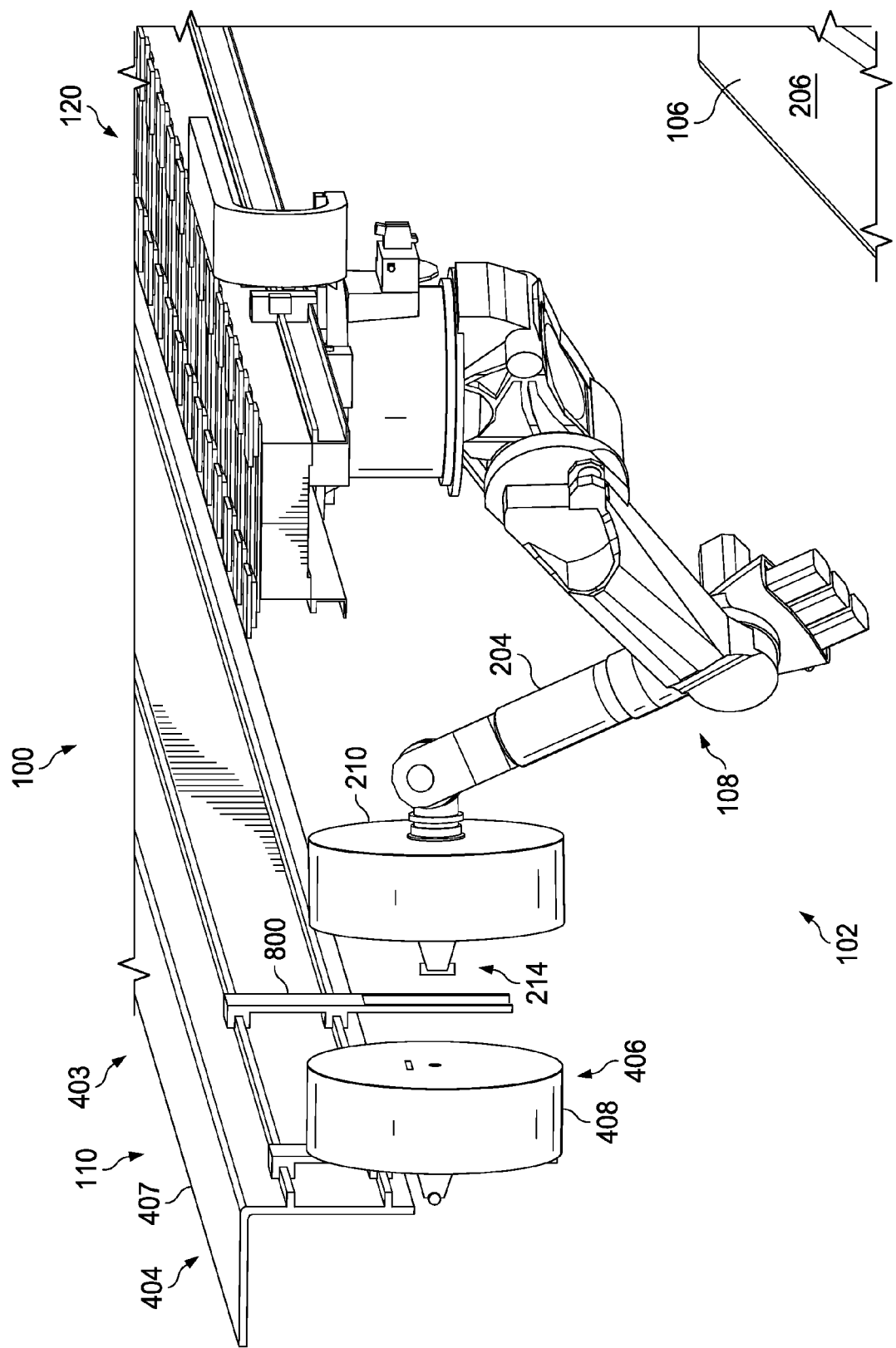
FIG. 8 is an illustration of a composite fiber placement system with a conveyor system in accordance with an illustrative embodiment.

With reference next to FIG. 8, an illustration of a composite fiber placement system with a conveyor system is depicted in accordance with an illustrative embodiment. In this depicted example, conveyor system 404 is shown in the direction of lines 8-8 from FIG. 5.

As illustrated, fiber placement device 214 is ready to be replaced. For example, fiber placement device 214 is out of fiber.

In this illustrative example, robotic positioning arm 204 has moved along linear track 120 to be positioned with respect to conveyor 407 in conveyor system 404. Robotic positioning arm 204 places fiber placement device 214 on receiver 800 on conveyor 407. Conveyor 407 may then move fiber placement device 214 to a location that does not interfere with the manufacturing process.

Figure 9:
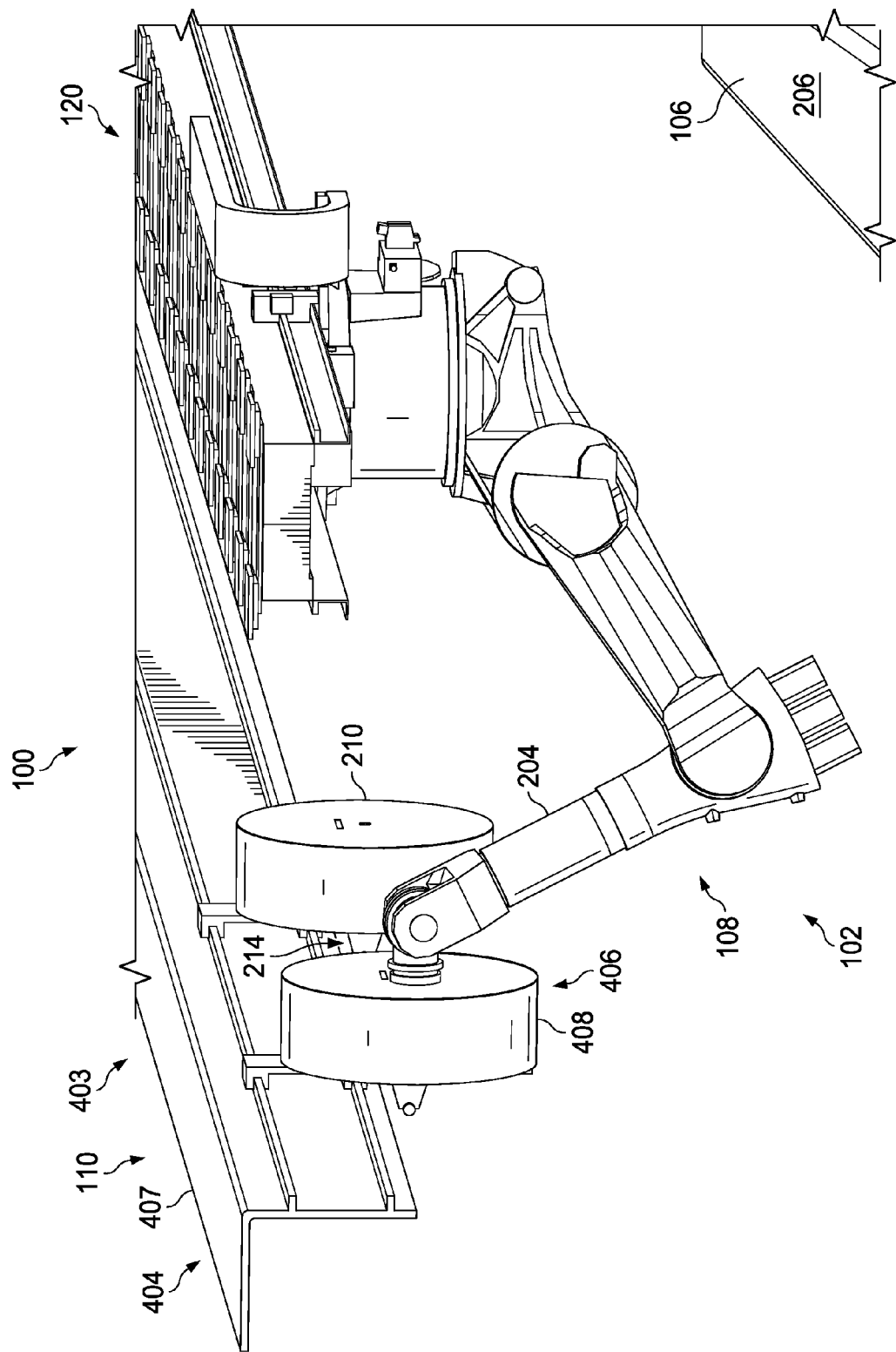
FIG. 9 is an illustration of a composite fiber placement system with a conveyor system in accordance with an illustrative embodiment.

In FIG. 9, an illustration of a composite fiber placement system with a conveyor system is depicted in accordance with an illustrative embodiment. In this depicted example, robotic positioning arm 204 attaches to fiber placement device 408 on conveyor 407. Fiber placement device 408 is a replacement device to be used to form composite part 106. In other words, fiber placement device 408 includes fiber.

In this depicted example, fiber placement device 408 is then used by robotic positioning arm 204 to place fibers 116. The process of exchanging one fiber placement device for another allows composite part 106 to be formed without long periods of delay due to the need for replacement devices.

Since conveyor 407 also runs along length 400 of tool 104, replacement fiber placement devices, or other tooling devices, can be accessed by robotic positioning arms at any of locations 118. As a result, the time needed to place fibers 116 is reduced.

In this illustrative example, the process illustrated in FIG. 8 and FIG. 9 may occur at any time without affecting the performance of other fiber placement devices 108. In other words, while robotic positioning arm 204 is exchanging fiber placement devices, robotic positioning arm 202 continues to perform tasks to form composite part 106.

The illustrations of composite fiber placement system 102 and the components within composite fiber placement system 102 shown in FIGS. 1-9 are not meant to imply physical or architectural limitations to the manner in which an illustrative embodiment may be implemented. Other components in addition to or in place of the ones illustrated may be used. Some components may be optional. Also, the blocks are presented to illustrate some functional components. One or more of these blocks may be combined, divided, or combined and divided into different blocks when implemented in an illustrative embodiment.

For example, although a single linear track is shown in overhead track system 110, additional linear tracks may be present. As an example, one or more additional linear tracks may be positioned to the left or right of linear track 120 such that additional fiber placement devices or other tooling devices may move along the length of tool 104.

Moreover, additional linear tracks may run in a direction other than co-axial to tool 104. For instance, a linear track may be positioned on an axis that runs perpendicular to the central axis of tool 104.

In still other illustrative examples, at least one of end effector 208 or end effector 210 may take forms other than fiber placement devices. For example, without limitation, at least one of end effector 208 or end effector 210 may take the form of a drill, a mill, a sprayer, a coating device, an inspection device, a camera, a printer, and other suitable types of devices. These devices may perform tasks on composite part 106 while composite part 106 is being formed, after composite part 106 is cured, or some combination thereof.

In yet another illustrative example, more than two fiber placement devices 108 may be present in composite fiber placement system 102. Each of these fiber placement devices operate in a coordinated manner under the coordinated control of scheduling controller 112. For example, three fiber placement devices, five fiber placement devices, ten fiber placement devices, or some other suitable number of fiber placement devices may perform tasks in a coordinated manner to form composite part 106. The number of fiber placement devices 108 may be selected based on the length of the composite part, the desired manufacturing time, other factors, or a combination thereof.

In another illustrative example, other forms of fiber placement devices and combinations of fiber placement devices may be present in manufacturing environment 100. For instance, overhead gantry systems may be used in addition to or in place of robotic positioning arms 200.

These gantry systems move along linear track 120 to access length 400 of tool 104 to place fibers 116. These gantry systems are under the coordinated control of scheduling controller 112 and operate in a coordinated manner, as described above. In some cases, gantry systems work in tandem with robotic positioning arms, depending on the particular implementation.

Figure 10:
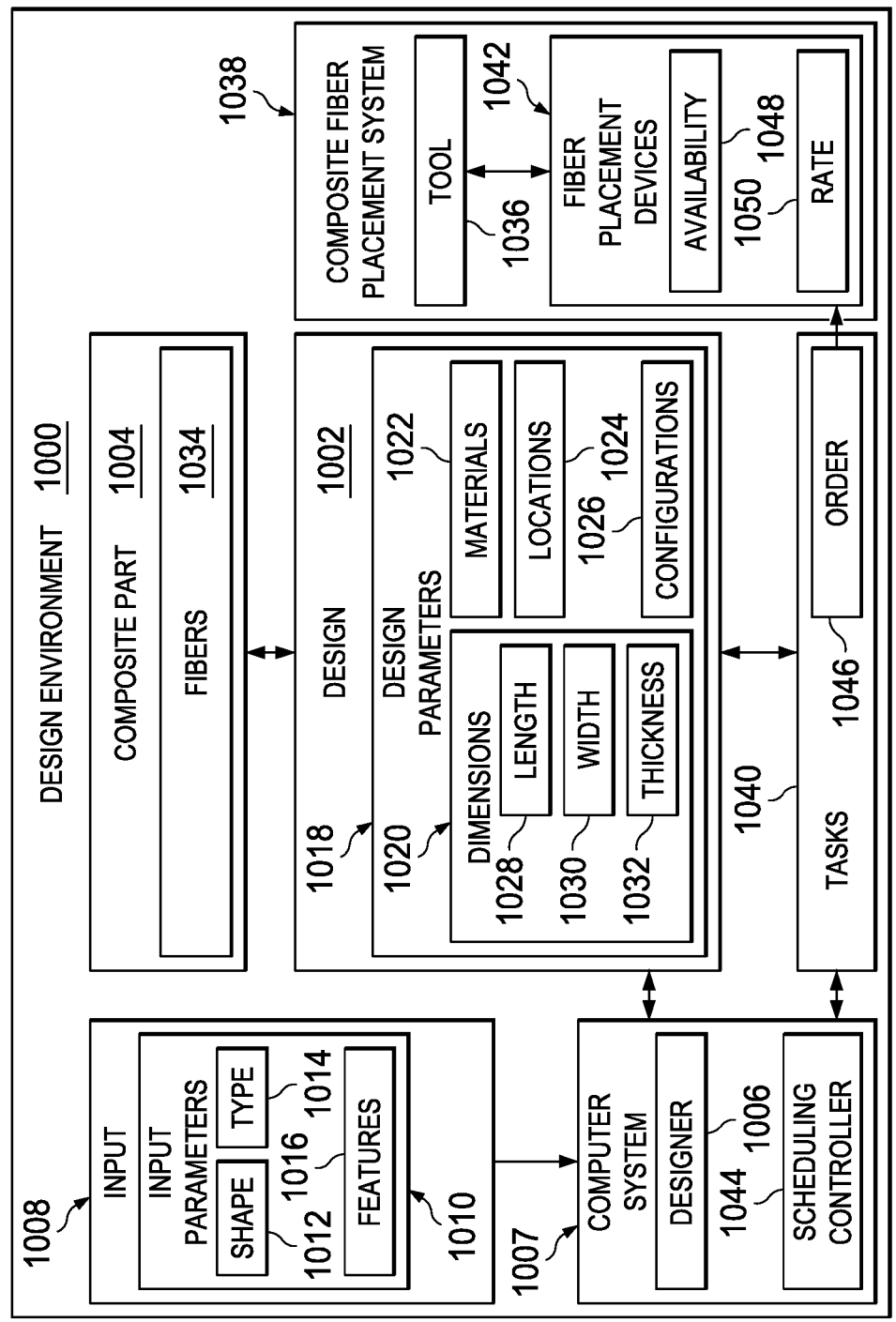
FIG. 10 is an illustration of a block diagram of a composite part design environment in accordance with an illustrative embodiment.

Turning next to FIG. 10, an illustration of a block diagram of a composite part design environment is depicted in accordance with an illustrative embodiment. As depicted, design environment 1000 is configured to generate design 1002 for composite part 1004 and manufacture composite part 1004. Composite part 106 in FIG. 1 is an example of a physical implementation for composite part 1004 shown in this figure.

In the illustrative example, designer 1006 is configured to generate design 1002. Designer 1006 may be implemented in software, hardware, firmware or a combination thereof.

Designer 1006 is located in computer system 1007 in this illustrative example. Computer system 1007 is comprised of a number of computers. A "number of" items, as used herein, means one or more items. In this illustrative example, a number of computers is one or more computers.

As depicted, designer 1006 may receive input 1008 for use in generating design 1002 for composite part 1004. For example, input 1008 may include input parameters 1010. Input parameters 1010 describes, for example, shape 1012 of composite part 1004, type 1014 of composite part 1004, features 1016 for composite part 1004, and other suitable parameters.

In this illustrative example, shape 1012 describes the contour of an outer surface of composite part 1004. Type 1014 is selected from at least one of a spar, a wingbox, a reservoir, a skin panel, a stringer, a beam, a frame, a fuselage section, a caul plate, a tooling device, a console, or other suitable types of parts.

As depicted, features 1016 are selected from one of a bend, a notch, an angled portion, a channel, a flange, a tapered portion, a protrusion, a chamfered edge, and other suitable features for composite part 1004. Bend 606 as shown in FIG. 6 is an example of one of features 1016.

Using input 1008, designer 1006 is configured to generate design 1002. In particular, designer 1006 may generate design parameters 1018 in design 1002 for composite part 1004.

As depicted, design parameters 1018 may include a number of different types of parameters. For example, design parameters 1018 may include at least one of dimensions 1020, materials 1022, locations 1024, configurations 1026, or other suitable parameters to describe the various attributes of composite part 1004.

In the illustrative example, dimensions 1020 may take various forms. Dimensions 1020 includes, for example, length 1028, width 1030, thickness 1032, and other dimensions. Dimensions 1020 may be specific to locations 1024 along composite part 1004. At least one of dimensions 1020 may be different at each one of locations 1024.

In this depicted example, materials 1022 may be used to describe the types of fibers 1034 used in each of locations 1024 for composite part 1004. Configurations 1026 describe a desired configuration for fibers 1034 to be placed on tool 1036 to form composite part 1004. Configurations 1026 are arrangements of fibers 1034 for sections of composite part 1004 or for composite part 1004 as a whole.

Design 1002 may be used by composite fiber placement system 1038 to manufacture composite part 1004. Specifically, design 1002 may be used to identify tasks 1040 to be performed by fiber placement devices 1042 in composite fiber placement system 1038. Fiber placement devices 1042 work at the same time to form composite part 1004 based on design 1002.

In this illustrative example, scheduling controller 1044, implemented in computer system 1007, identifies order 1046 for tasks 1040 and assigns tasks 1040 to fiber placement devices 1042 based on order 1046. Scheduling controller 112 described with reference to FIG. 1 and FIG. 4 is an example of an implementation for scheduling controller 1044.

Scheduling controller 1044 modifies tasks 1040 in real time based on at least one of availability 1048, rate 1050, and other parameters of fiber placement devices 1042. Tasks 1040 are not pre-programmed in this illustrative example. Availability 1048 and rate 1050 may be the same or different for each of fiber placement devices 1042.

In this depicted example, availability 1048 may represent whether one of fiber placement devices 1042 are ready for use. Availability 1048 is indicated by a status selected from at least one of online, offline, available, unavailable, or other suitable statuses. For example, when one of fiber placement devices 1042 becomes unavailable, tasks 1040 for the other fiber placement devices may be modified accordingly to form composite part 1004.

In this illustrative example, rate 1050 is the speed at which one of fiber placement devices 1042 is performing tasks 1040. Based on rate 1050, scheduling controller 1044 can modify the assignment of tasks 1040 to form composite part 1004 in an efficient manner. For instance, if rate 1050 for one of fiber placement devices 1042 is less than desired, scheduling controller 1044 modifies tasks 1040 to replace the fiber placement device, assist the fiber placement device, speed up the fiber placement device, or a combination thereof.

After scheduling controller 1044 assigns tasks 1040, fibers 1034 are placed on tool 1036 in configurations 1026 by fiber placement devices 1042. Tasks 1040 are monitored and modified in real time by scheduling controller 1044.

The illustration of design environment 1000 in FIG. 10 is not meant to imply physical or architectural limitations to the manner in which an illustrative embodiment may be implemented. Other components in addition to or in place of the ones illustrated may be used. Some components may be optional.

The different components shown in FIGS. 1-9 may be illustrative examples of how components shown in block form in FIG. 10 can be implemented as physical structures. Additionally, some of the components in FIGS. 1-9 may be combined with components in FIG. 10, used with components in FIG. 10, or a combination of the two.

For example, instead of having a centralized scheduling controller 1044, portions of scheduling controller 1044 may be integrated in each of fiber placement devices 1042. In this case, fiber placement devices 1042 communicate with each other using wireless communications links such that each device knows the position, orientation, and tasks assigned to the other devices.

Figure 11:
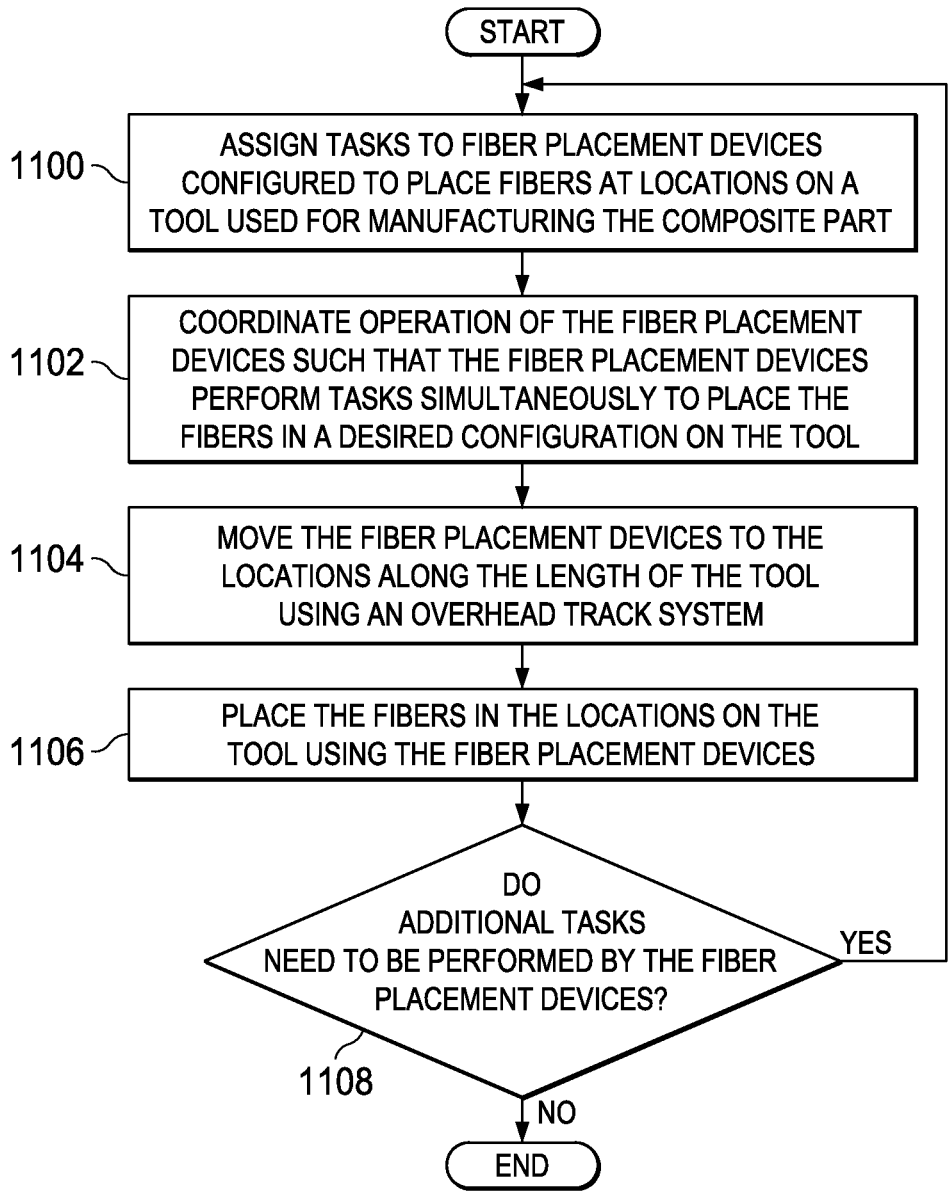
FIG. 11 is an illustration of flowchart of a process for manufacturing a composite part in accordance with an illustrative embodiment.

With reference now to FIG. 11, an illustration of flowchart of a process for manufacturing a composite part is depicted in accordance with an illustrative embodiment. The process illustrated in FIG. 11 may be implemented using composite fiber placement system 102 shown in FIG. 1.

The process begins by assigning tasks to fiber placement devices configured to place fibers at locations on a tool used for manufacturing the composite part (operation 1100). Next, the process coordinates operation of the fiber placement devices such that the fiber placement devices perform tasks simultaneously to place the fibers in a desired configuration on the tool (operation 1102).

Thereafter, the process moves the fiber placement devices to the locations along the length of the tool using an overhead track system (operation 1104). The process then places the fibers in the locations on the tool using the fiber placement devices (operation 1106).

Next, the process determines whether additional tasks need to be performed by the fiber placement devices (operation 1108). If additional tasks need to be performed by the fiber placement devices, the process returns to operation 1100 as described above. If additional tasks do not need to be performed, the process terminates.

The process described in FIG. 11 is implemented by each of fiber placement devices 108. For example, when one of fiber placement devices 108 completes a task, scheduling controller 112 may assign that device an additional task. This situation occurs while other fiber placement devices 108 perform different tasks. In this manner, the process occurs at different times for each of fiber placement devices 108.

In addition, in some illustrative examples, scheduling controller 112 reassigns tasks to different fiber placement devices 108 in real time or commands two or more fiber placement devices 108 to work in the same location. Fiber placement devices 108 work at the same time under the coordinated control of scheduling controller 112 in this illustrative example.

Figure 12:
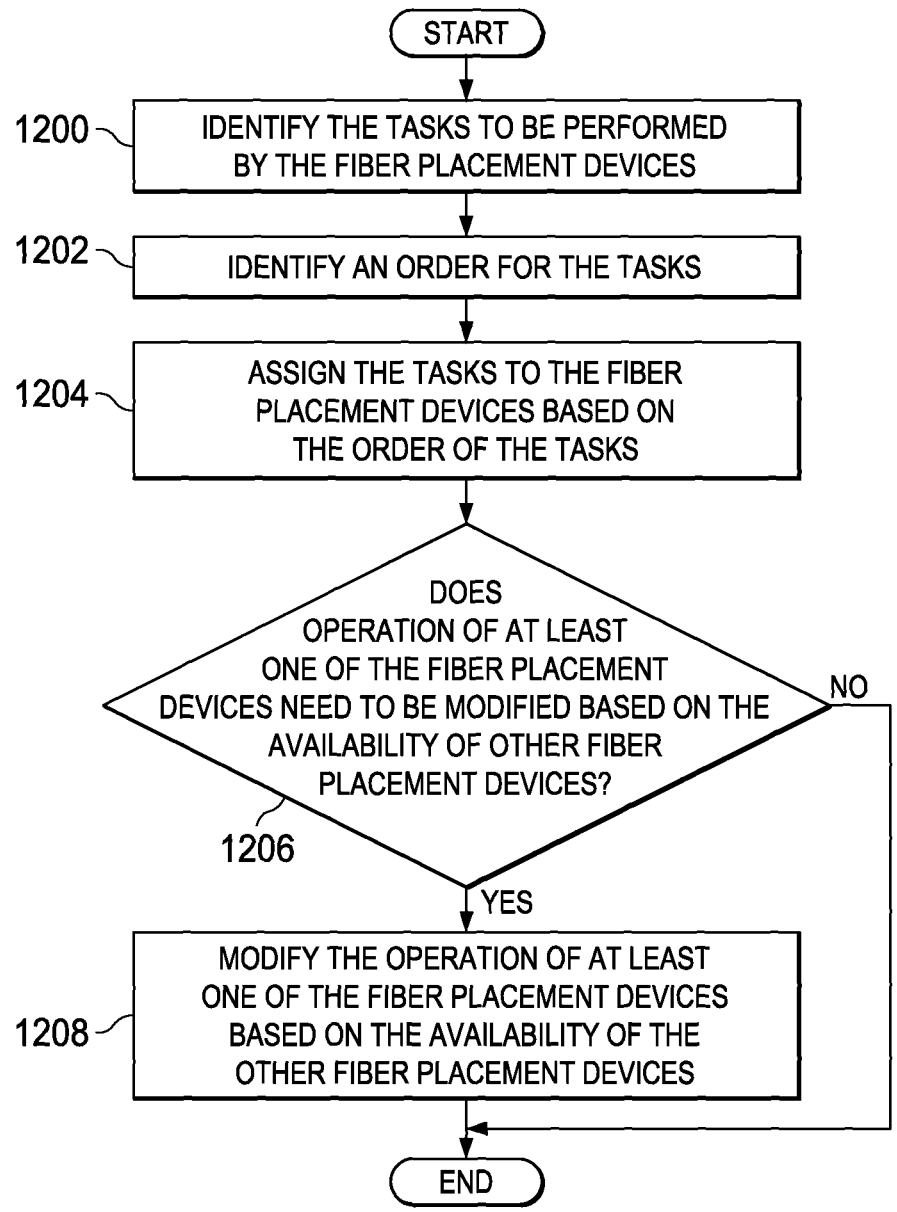
FIG. 12 is an illustration of a flowchart of a process for assigning tasks to fiber placement devices in accordance with an illustrative embodiment.

Turning next to FIG. 12, an illustration of a flowchart of a process for assigning tasks to fiber placement devices is depicted in accordance with an illustrative embodiment. The process illustrated in FIG. 12 may be implemented using scheduling controller 112 in composite fiber placement system 102 shown in FIG. 1.

The process begins by identifying the tasks to be performed by the fiber placement devices (operation 1200). Next, the process identifies an order for the tasks (operation 1202).

Thereafter, the process assigns the tasks to the fiber placement devices based on the order of the tasks (operation 1204). A determination is then made as to whether operation of at least one of the fiber placement devices needs to be modified based on the availability of other fiber placement devices (operation 1206).

If operation of at least one of the fiber placement devices needs to be modified, the process modifies the operation of at least one of the fiber placement devices based on the availability of the other fiber placement devices (operation 1208), with the process terminating thereafter. If operation of at least one of the fiber placement devices does not need to be modified, the process terminates.

In operation 1208, the modification may be made by reassigning tasks to the fiber placement devices. The modification also may include changing a status for one or more fiber placement devices. For example, if one of the fiber placement devices is not functioning as desired, the modification includes taking that fiber placement device offline, replacing the fiber placement device, or taking some other action. In other illustrative examples, the modification includes switching tasks between fiber placement devices with or without reprioritizing the tasks.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of module, a segment, a function, or a portion a combination thereof of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Figure 13:
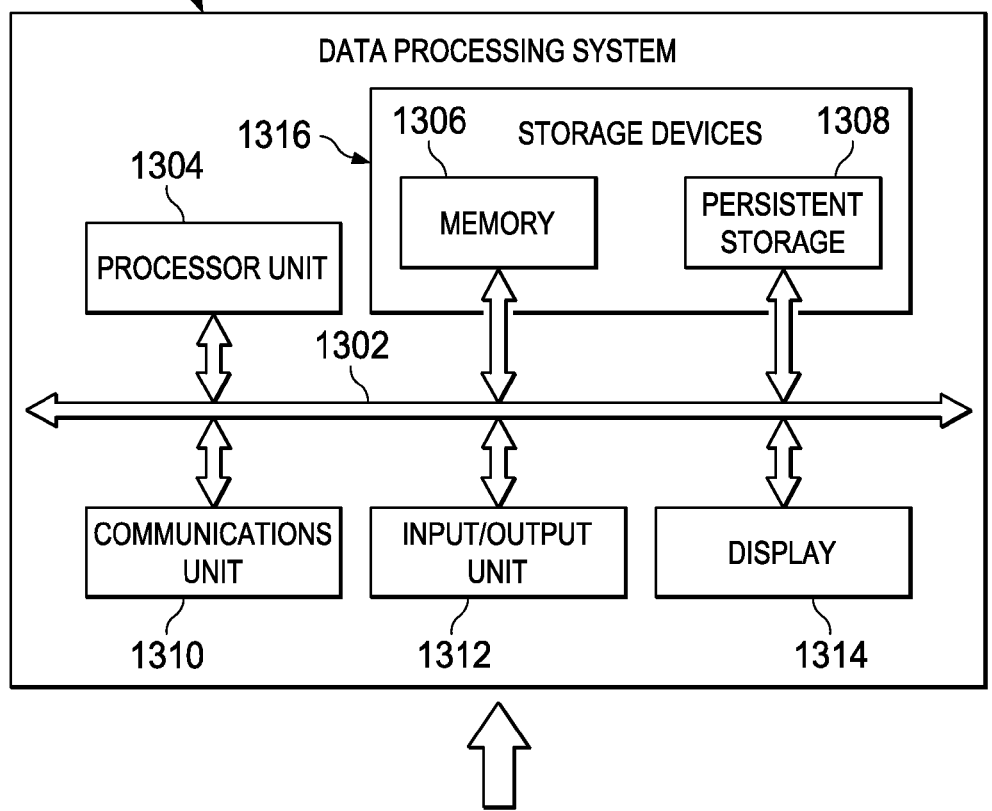
FIG. 13 is an illustration of a data processing system in the form of a block diagram in accordance with an illustrative embodiment.
Figure 13:
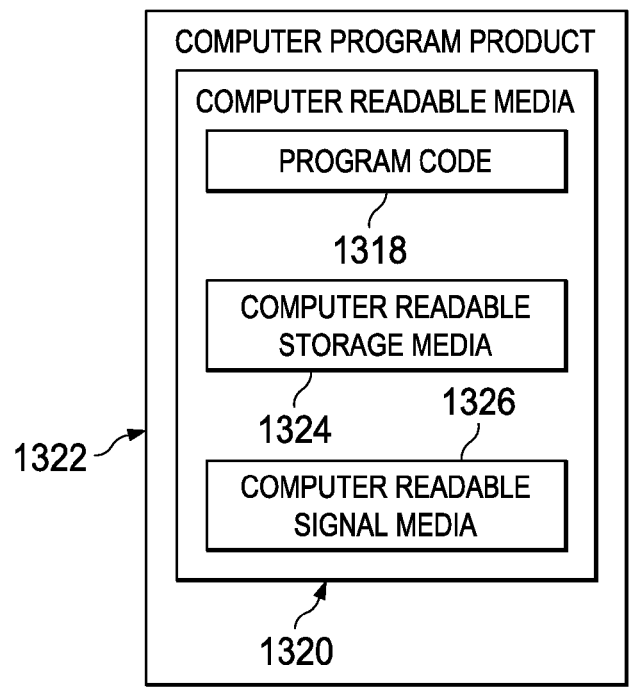

Turning now to FIG. 13, an illustration of a data processing system in the form of a block diagram is depicted in accordance with an illustrative embodiment. Data processing system 1300 may be used to implement one or more computers in computer system 124 in FIG. 1. As depicted, data processing system 1300 includes communications framework 1302, which provides communications between processor unit 1304, storage devices 1306, communications unit 1308, input/output unit 1310, and display 1312. In some cases, communications framework 1302 may be implemented as a bus system.

Processor unit 1304 is configured to execute instructions for software to perform a number of operations. Processor unit 1304 may comprise a number of processors, a multi-processor core, some other type of processor, or some combination thereof, depending on the implementation. In some cases, processor unit 1304 may take the form of a hardware unit, such as a circuit system, an application specific integrated circuit (ASIC), a programmable logic device, or some other suitable type of hardware unit.

Instructions for the operating system, applications, programs, or both run by processor unit 1304 may be located in storage devices 1306. Storage devices 1306 may be in communication with processor unit 1304 through communications framework 1302. As used herein, a storage device, also referred to as a computer readable storage device, is any piece of hardware capable of storing information on a temporary basis, permanent basis, or both. This information may include, but is not limited to, at least one of data, program code, or other information.

Memory 1314 and persistent storage 1316 are examples of storage devices 1306. Memory 1314 may take the form of, for example, a random access memory or some type of volatile or non-volatile storage device. Persistent storage 1316 may comprise any number of components or devices. For example, persistent storage 1316 may comprise a hard drive, a flash memory, a rewritable optical disk, a rewritable magnetic tape, or some combination of the above. The media used by persistent storage 1316 may or may not be removable.

Communications unit 1308 allows data processing system 1300 to communicate with other data processing systems, devices, or some combination thereof. Communications unit 1308 may provide communications using physical communications links, wireless communications links, or a combination thereof.

Input/output unit 1310 allows input to be received from and output to be sent to other devices connected to data processing system 1300. For example, input/output unit 1310 may allow user input to be received through at least one of a keyboard, a mouse, or some other type of input device. As another example, input/output unit 1310 may allow output to be sent to a printer connected to data processing system 1300.

Display 1312 is configured to display information to a user. Display 1312 may comprise, for example, without limitation, selected from one of a monitor, a touch screen, a laser display, a holographic display, a virtual display device, or some other type of display device.

In this illustrative example, the processes of the different illustrative embodiments may be performed by processor unit 1304 using computer-implemented instructions. These instructions may be referred to as program code, computer usable program code, or computer readable program code and may be read and executed by one or more processors in processor unit 1304.

In these examples, program code 1318 is located in a functional form on computer readable media 1320, which is selectively removable, and may be loaded onto or transferred to data processing system 1300 for execution by processor unit 1304. Program code 1318 and computer readable media 1320 together form computer program product 1322. In this illustrative example, computer readable media 1320 may be computer readable storage media 1324 or computer readable signal media 1326.

Computer readable storage media 1324 is a physical or tangible storage device used to store program code 1318 rather than a medium that propagates or transmits program code 1318. Computer readable storage media 1324 may be, for example, without limitation, an optical or magnetic disk or a persistent storage device that is connected to data processing system 1300.

Alternatively, program code 1318 may be transferred to data processing system 1300 using computer readable signal media 1326. Computer readable signal media 1326 may be, for example, a propagated data signal containing program code 1318. This data signal may be an electromagnetic signal, an optical signal, or some other type of signal that can be transmitted over physical, wireless communications links, or some combination thereof.

The illustration of data processing system 1300 in FIG. 13 is not meant to provide architectural limitations to the manner in which the illustrative embodiments may be implemented. The different illustrative embodiments may be implemented in a data processing system that includes components in addition to or in place of those illustrated for data processing system 1300. Further, components shown in FIG. 13 may be varied from the illustrative examples shown.

Figure 14:
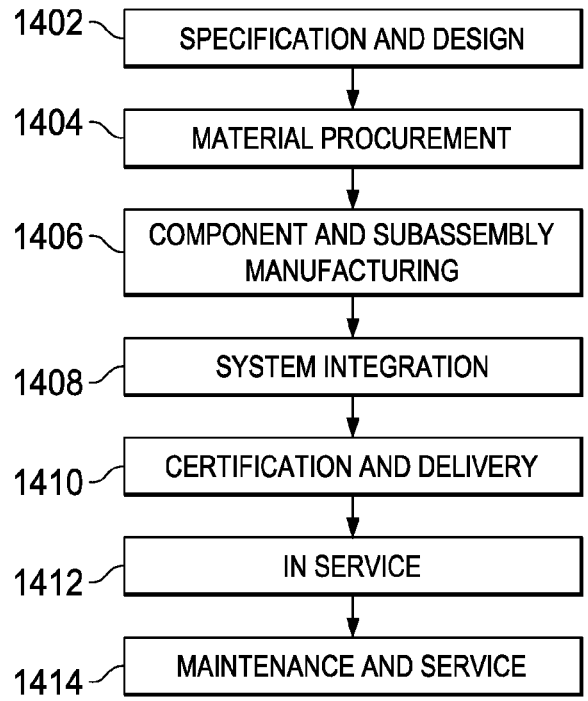
FIG. 14 is an illustration of an aircraft manufacturing and service method in the form of a block diagram in accordance with an illustrative embodiment.
Figure 15:
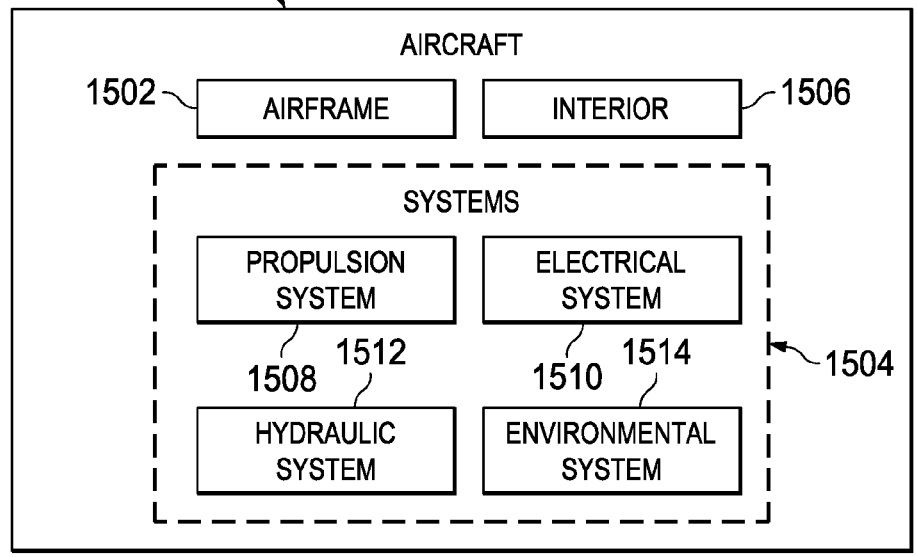
FIG. 15 is an illustration of an aircraft in the form of a block diagram in which an illustrative embodiment may be implemented.

Illustrative embodiments of the disclosure may be described in the context of aircraft manufacturing and service method 1400 as shown in FIG. 14 and aircraft 1500 as shown in FIG. 15. Turning first to FIG. 14, an illustration of an aircraft manufacturing and service method is depicted in the form of a block diagram in accordance with an illustrative embodiment. During pre-production, aircraft manufacturing and service method 1400 may include specification and design 1402 of aircraft 1500 in FIG. 15 and material procurement 1404.

During production, component and subassembly manufacturing 1406 and system integration 1408 of aircraft 1500 in FIG. 15 takes place. Thereafter, aircraft 1500 in FIG. 15 may go through certification and delivery 1410 in order to be placed in service 1412. While in service 1412 by a customer, aircraft 1500 in FIG. 15 is scheduled for routine maintenance and service 1414, which may include modification, reconfiguration, refurbishment, and other maintenance or service.

Each of the processes of aircraft manufacturing and service method 1400 may be performed or carried out by a system integrator, a third party, an operator, or a combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 15, an illustration of an aircraft is depicted in the form of a block diagram in which an illustrative embodiment may be implemented. In this example, aircraft 1500 is produced by aircraft manufacturing and service method 1400 in FIG. 14 and may include airframe 1502 with plurality of systems 1504 and interior 1506. Examples of systems 1504 include one or more of propulsion system 1508, electrical system 1510, hydraulic system 1512, and environmental system 1514. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1400 in FIG. 14. In particular, composite fiber placement system 102 from FIG. 1 may be used to form composite part 106 for use in aircraft 1500. For example, without limitation, composite fiber placement system 102 may be used to form composite part 106 during component subassembly manufacturing 1406, system integration 1408. In another illustrative example, rework of composite part 106 may be performed during routine maintenance and service 1414 or some other stage of aircraft manufacturing and service method 1400.

In one illustrative example, components or subassemblies produced in component and subassembly manufacturing 1406 in FIG. 14 may be fabricated or manufactured in a manner similar to components or subassemblies produced while aircraft 1500 is in service 1412 in FIG. 14. As yet another example, one or more apparatus embodiments, method embodiments, or a combination thereof may be utilized during production stages, such as component and subassembly manufacturing 1406 and system integration 1408 in FIG. 14. One or more apparatus embodiments, method embodiments, or a combination thereof may be utilized while aircraft 1500 is in service 1412, during maintenance and service 1414 in FIG. 14, or a combination thereof. The use of a number of the different illustrative embodiments may substantially expedite the assembly, reduce the cost of aircraft 1500, or both.

Thus, the illustrative embodiments provide a method and system for manufacturing composite part 106. In an illustrative example, composite fiber placement system 102 comprises fiber placement devices 108, overhead track system 110, and scheduling controller 112. Fiber placement devices 108 are configured to operate in a coordinated manner to place fibers 116 at locations 118 on tool 104 used for manufacturing composite part 106. Overhead track system 110 comprises linear track 120 running co-axial to tool 104. Overhead track system 110 is associated with fiber placement devices 108 and configured to move fiber placement devices 108 to locations 118 along length 400 of tool 104. Scheduling controller 112 is configured to coordinate operation of fiber placement devices 108 such that fiber placement devices 108 perform tasks simultaneously to place fibers 116 in a desired configuration on tool 104.

With the use of an illustrative embodiment, composite part 106 is manufactured more efficiently than with some currently used systems. As additional fiber placement devices 108 are added to manufacturing environment 100, scheduling controller 112 has the capabilities to provide coordinated control of these devices.

In this manner, fiber placement devices 108 place fibers 116 at various locations 118 along length 400 of tool 104 at the same time without the risk of undesired encounters with other devices. Scheduling controller 112 prioritizes tasks, sets the perimeter of each work cell, and monitors the position, availability, and rate of each of fiber placement devices 108 in real time.

The illustrative embodiments also provide the ability for fiber placement devices 108 to operate independently of one another. For example, when one of fiber placement devices 108 is unavailable, the other devices continue to perform assigned tasks. As a result, the downtime of composite fiber placement system 102 is reduced or eliminated.

The design of composite fiber placement system 102 also allows for the use of some commercially available robotic devices to be mounted on linear track 120. These devices may be smaller, lighter weight, and move in a greater number of degrees of freedom than some currently used systems.

In addition, overhead track system 110 provides for each of fiber placement devices 108 to move along the entire length of tool 104 if desired. Because each device has the ability to place continuous fibers along length 400 of tool 104, long, complex composite parts can be manufactured in an efficient manner.

For example, with the use of composite fiber placement system 102, composite part 106 is formed in one piece. As a result, additional manufacturing steps of joining sections of composite part 106 may be reduced or eliminated. Weight added by fasteners used to join these sections is also reduced or eliminated.

Thus, composite fiber placement system 102 with linear track 120 allows for the efficient manufacture of composite parts that are over one hundred feet long with various features such as bends, grooves, and flanges, among others. As an example, instead of manufacturing the composite part in sections, the illustrative embodiments recognize and take into account that a system with the ability to move about the entire length of the tool, while also having access to all surfaces of the tool, may result in the formation of long, complex composite parts more efficiently than some currently used systems.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A system for manufacturing a composite part comprising:
    fiber placement devices configured to operate in a coordinated manner to place fibers at locations on a tool used for manufacturing the composite part;
    an overhead track system comprising a first linear track running parallel to an axis of the tool, wherein the overhead track system is associated with the fiber placement devices and configured to move the fiber placement devices to the locations along a length of the tool;
    an overhead conveyor system comprising a second linear track running parallel to the axis of the tool to receive one or more of the fiber placement devices and to provide one or more replacement fiber placement devices;
    a scheduling controller configured to coordinate operation of the fiber placement devices such that the fiber placement devices perform tasks simultaneously to place fibers in a desired configuration on the tool;
    wherein the fiber placement devices are mounted on robotic positioning arms configured to move using the first linear track and to affix a fiber placement device onto a first receiver of the overhead conveyor system and to pick up a replacement fiber placement device from a second receiver of the conveyor system; and
    wherein the first receiver and the second receiver are moveably engaged to the second linear track system.

2. The system of claim 1, wherein the fiber placement devices are configured to operate independently of one another and wherein the second linear track system is a gravity roller system.

3. The system of claim 1, wherein the scheduling controller is configured to identify an order for the tasks performed by the fiber placement devices and assign each of the tasks to one of the fiber placement devices based on the order of the tasks.

4. The system of claim 1, wherein the scheduling controller is configured to modify the operation of at least one of the fiber placement devices based on an availability of another of the fiber placement devices.

5. The system of claim 4, wherein the scheduling controller is configured to reassign the tasks when one of the fiber placement devices becomes unavailable.

6. The system of claim 1, wherein a robotic positioning arm in the robotic positioning arms is configured to move about the tool such that the robotic positioning arm accesses substantially all of a surface of the tool.

7. The system of claim 1, wherein the fiber placement devices are configured to place a continuous fiber along the length of the composite part.

8. The system of claim 1, wherein the composite part has a thickness that changes between locations along the length of the composite part and wherein the fiber placement devices are configured to move about the tool such that the fibers are placed in the desired configuration with respect to the thickness at the locations.

9. The system of claim 1, wherein each of the fiber placement devices is configured to move along the first linear track over the length of the tool to place the fibers in the desired configuration.

10. A method for manufacturing a composite part, the method comprising:
    assigning tasks to fiber placement devices configured to place fibers at locations on a tool used for manufacturing the composite part;
    coordinating operation of the fiber placement devices such that the fiber placement devices perform the tasks simultaneously to place the fibers in a desired configuration on the tool;
    moving the fiber placement devices to the locations along a length of the tool using an overhead track system comprising a first linear track that parallel to the length of the tool;
    providing a replacement fiber placement device on an overhead conveyor system comprising a second linear track running parallel to the length of the tool;
    placing the fibers in the locations on the tool using the fiber placement devices;
    wherein a robotic positioning arm mounted on the first linear track system is configured to place a fiber placement device onto a first receiver movably affixed to the second linear track and to pick up the replacement fiber placement device from a second receiver movably affixed to the second linear track.

11. The method of claim 10 further comprising:
    identifying the tasks to be performed by the fiber placement devices;
    identifying an order for the tasks;
    assigning the tasks to the fiber placement devices based on the order of the tasks; and
    moving the fiber placement devices along the first linear track to perform the tasks in a coordinated manner.

12. The method of claim 10 further comprising:
    modifying the operation of at least one of the fiber placement devices based on an availability of another of the fiber placement devices.

13. The method of claim 10 further comprising:
    performing the tasks to manufacture the composite part.

14. The method of claim 10, wherein the fiber placement devices are mounted on robotic positioning arms configured to move using the overhead track system and further comprising:
    moving a robotic positioning arm in the robotic positioning arms about the tool such that the robotic positioning arm accesses substantially all of the tool to place the fibers in the desired configuration.

15. The method of claim 10 further comprising:
    placing a continuous fiber along the length of the composite part using the fiber placement devices.

16. A composite fiber placement system comprising:
    robotic positioning arms configured to move along a first linear track positioned over and parallel to an axis of a tool used for manufacturing a composite part;
    one or more fiber placement devices associated with the robotic positioning arms and configured to operate in a coordinated manner to place fibers at locations on the tool;
    a second linear track positioned over and parallel to the axis of the tool and configured to receive a fiber placement device on a first receiver and to provide a replacement fiber placement device on a second receiver;
    a scheduling controller configured to identify an order for tasks performed by the fiber placement devices, assign each of the tasks to one of the fiber placement devices based on the order of the tasks, and coordinate operation of the fiber placement devices such that the fiber placement devices perform the tasks simultaneously to place the fibers in a desired configuration on the tool;
    wherein the robotic positioning arms are configured to place the fiber placement device onto the first receiver and to pick up the replacement fiber placement device from the second receiver;
    wherein the first receiver and the second receiver are moveably engaged to a second linear track system.

17. The composite fiber placement system of claim 16, wherein the first linear track system is a gravity roller system.

18. The composite fiber placement system of claim 16, wherein the fiber placement devices are configured to place a continuous fiber along a length of the composite part.

19. The composite fiber placement system of claim 16, wherein a first fiber placement device, responsive to a second fiber placement device going offline, is configured to assume tasks assigned to the second fiber placement device.

* * * * *

UNITED STATES PATENT AND TRADEMARK OFFICE
CERTIFICATE OF CORRECTION

PATENT NO. : 9,782,938 B2  
APPLICATION NO. : 14/221343  
DATED : October 10, 2017  
INVENTOR(S) : Samuel Francis Pedigo and Brice Aaron Johnson Page 1 of 1

It is certified that error appears in the above-identified patent and that said Letters Patent is hereby corrected as shown below:

In the Claims

Column 20, Line 36, after "the" insert --overhead--  
Column 21, Line 15, after "that" insert --runs--  
Column 22, Line 1, change "a" to --the--  
Column 22, Line 36, change "first" to --second--

Signed and Sealed this  
Twenty-sixth Day of December, 2017

Joseph Matal  
*Performing the Functions and Duties of the*  
*Under Secretary of Commerce for Intellectual Property and*  
*Director of the United States Patent and Trademark Office*